United States Patent [19]

Dhadwal et al.

[11] Patent Number: 5,790,727

[45] Date of Patent: Aug. 4, 1998

[54] LASER ILLUMINATION OF MULTIPLE CAPILLARIES THAT FORM A WAVEGUIDE

[75] Inventors: Harbans S. Dhadwal, Setauket; Mark A. Quesada, Middle Island; F. William Studier, Stony Brook, all of N.Y.

[73] Assignee: Brookhaven Science Associates LLC., Upton, N.Y.

[21] Appl. No.: 796,097

[22] Filed: Feb. 5, 1997

[51] Int. Cl.$^6$ .................................................... G02B 6/26

[52] U.S. Cl. ......................... 385/38; 385/901; 385/115; 385/83; 385/44

[58] Field of Search ........................ 385/901, 31, 33, 385/44, 47, 38, 115, 83

[56] References Cited

U.S. PATENT DOCUMENTS

| | | | |
|---|---|---|---|
| 5,009,503 | 4/1991 | Murphy, Jr. et al. | 356/339 |
| 5,165,773 | 11/1992 | Nath | 385/125 |
| 5,324,401 | 6/1994 | Yeung et al. | 204/180.1 |
| 5,440,664 | 8/1995 | Harrington et al. | 385/125 |
| 5,450,516 | 9/1995 | Pasquali et al. | 385/115 |

OTHER PUBLICATIONS

Anazawa, et al., "A Capillary Array Gel Electrophoresis System Using Multiple Laser Focusing for DNA Sequencing", *Anal. Chem.*, 1996, 68, 2699–2704.

*Primary Examiner*—John Ngo
*Attorney, Agent, or Firm*—Margaret C. Bogosian

[57] ABSTRACT

A system and method are disclosed for efficient laser illumination of the interiors of multiple capillaries simultaneously, and collection of light emitted from them. Capillaries in a parallel array can form an optical waveguide wherein refraction at the cylindrical surfaces confines side-on illuminating light to the core of each successive capillary in the array. Methods are provided for determining conditions where capillaries will form a waveguide and for assessing and minimizing losses due to reflection. Light can be delivered to the arrayed capillaries through an integrated fiber optic transmitter or through a pair of such transmitters aligned coaxially at opposite sides of the array. Light emitted from materials within the capillaries can be carried to a detection system through optical fibers, each of which collects light from a single capillary, with little cross talk between the capillaries. The collection ends of the optical fibers can be in a parallel array with the same spacing as the capillary array, so that the collection fibers can all be aligned to the capillaries simultaneously. Applicability includes improving the efficiency of many analytical methods that use capillaries, including particularly high-throughput DNA sequencing and diagnostic methods based on capillary electrophoresis.

50 Claims, 17 Drawing Sheets

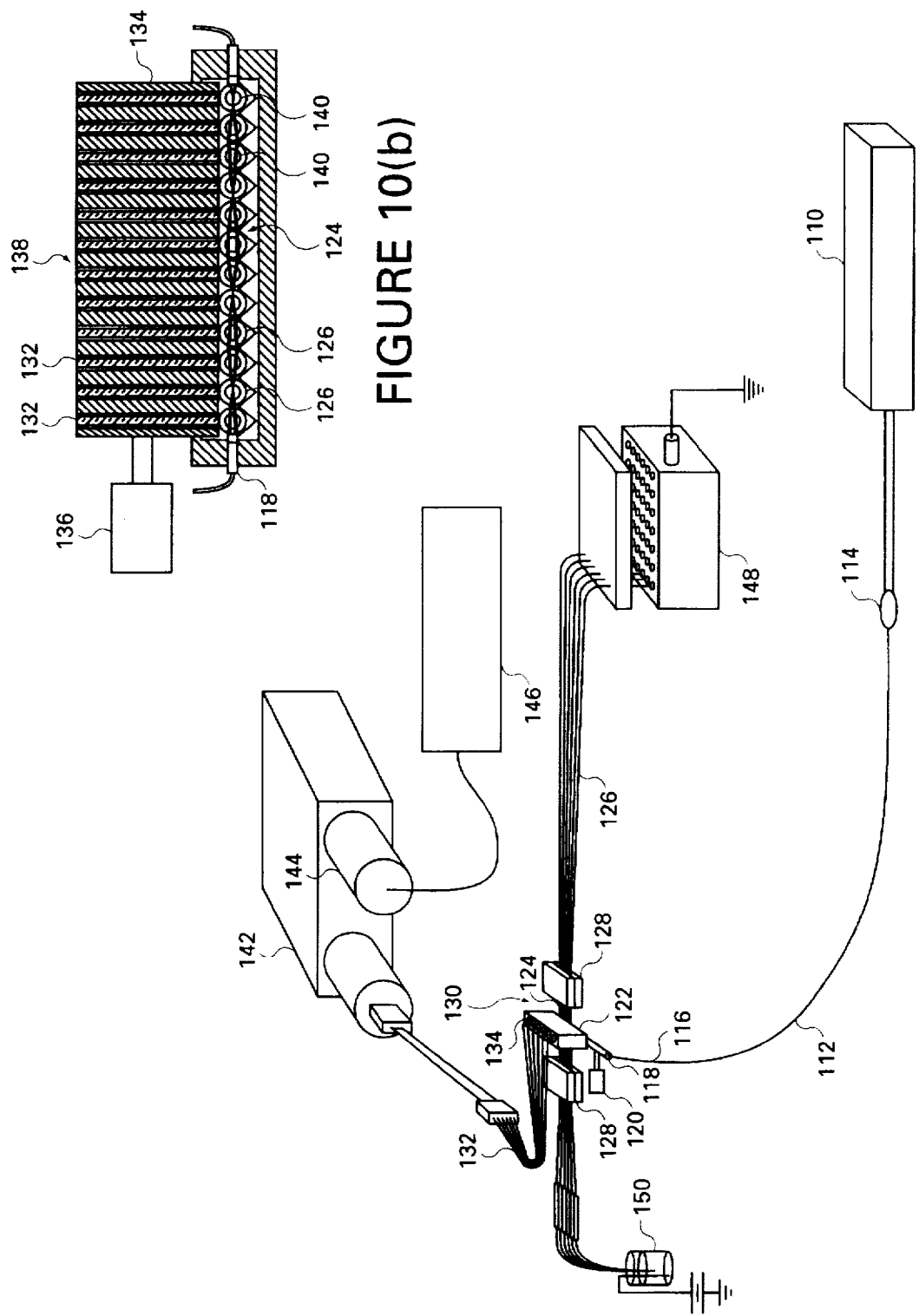

LASER ILLUMINATION OF MULTIPLE CAPILLARIES THAT FORM A WAVEGUIDE

This invention was made with Government support under contract number DE-AC02-76CH00016, awarded by the U.S. Department of Energy. The Government has certain rights in the invention.

BACKGROUND OF THE INVENTION

The present invention relates generally to optical sensing systems, and, more particularly, to laser illumination of multiple capillaries that form a waveguide.

Capillary electrophoresis is a widely useful analytical tool. The small capillary core and efficient heat dissipation allow large voltage gradients and rapid separations of charged species. A particularly useful application is rapid separation of fluorescently labeled DNA molecules, which has wide application for DNA sequencing, genetic analysis, medical diagnosis, and forensics. Typically, separations are monitored by illuminating a small region of the capillary core with a laser and measuring the induced fluorescence as molecules move through the illuminated region. Other types of separations are also performed in capillaries, and they also use laser illumination and detection of photons emitted from the core of the capillary.

The analytical capacity of capillary separation techniques is multiplied by using many capillaries in parallel. However, illumination of the capillary cores and detection of emitted photons is complicated by the cylindrical shape of the capillaries. Refraction and reflections from the many curved surfaces make it difficult to obtain reasonably uniform illumination and sensitive detection across many capillaries.

Several ways of illuminating multiple capillaries and detecting fluorescence have been used. One configuration focusses the laser beam through a cylindrical lens into a line that illuminates multiple parallel capillaries. Kyoji Ueno & Edward S. Yeung, "Simultaneous Monitoring of DNA Fragments Separated by Electrophoresis in a Multiplexed Array of 100 Capillaries," *Analytical Chemistry* v. 66 n. 9 1424–31 (May 1, 1994). The fluorescence is imaged onto a detector such as a charge-coupled device (CCD). In this configuration, a relatively small fraction of the light reaches the core of the capillaries, most being reflected or refracted elsewhere by the cylindrical capillary surfaces, and cross talk between fluorescent signals from different capillaries can be a problem. The low efficiency means that considerable laser power is required, and sensitivity is reduced by the large amounts of stray light.

One way to reduce the amount of stray light is to immerse the capillaries in a fluid that, by reducing the refractive index difference between the outside medium and the capillary, reduces the amount of reflected light. This strategy has been used with side-on illumination of parallel capillaries immersed in water (that is, illuminating a parallel array of capillaries with a focussed laser beam in the plane of the array and normal to the capillaries). Xiandan Lu & Edward S. Yeung, "Optimization of Excitation and Detection Geometry for Multiplexed Capillary Array Electrophoresis of DNA Fragments," *Applied Spectroscopy* v. 49 n. 5 605–09 (1995). The technique disclosed by Lu and Yeung does not attempt to make any provision for refraction at the cores of the capillaries, and consequently requires use of a relatively high power, large diameter beam.

Stray light can also be greatly reduced by illuminating each capillary through a dedicated optical fiber, as discussed in U.S. Pat. Nos. 5,324,401 and 5,413,686. Unfortunately, such configurations also require considerable laser power.

Other configurations largely eliminate the problem of stray light and reduce the laser power required. One solution is to use confocal illumination and collection, together with a scanning system that allows each capillary to be analyzed individually in turn, as in U.S. Pat. No. 5,274,240. In such systems, the speed of data collection is limited by the scan speed. Yet, another solution is to bypass illumination of the cylindrical capillary surfaces altogether, by using sheath-flow technology to analyze the fluorescence in free solution immediately below the ends of the capillaries, as in U.S. Pat. Nos. 5,439,578 and 5,366,608. The sheath-flow technologies require great care in controlling the flow of the sheathing liquid, to prevent any turbulence or bubbles which would cause optical distortion.

As discussed above, prior art devices suffer from a number of disadvantages. There is, therefore, a need in the prior art for an apparatus and method which permit efficient, relatively uniform laser illumination of multiple capillaries that form a waveguide.

SUMMARY OF THE INVENTION

The present invention, which addresses the needs of the prior art, provides a system and method for simultaneously illuminating one or more materials in limited volumes of the cores of a plurality of capillaries. The system includes a plurality of substantially cylindrical capillaries. Each of the capillaries in turn includes a substantially cylindrical core, a substantially transparent wall bounding the core (which has inner and outer surfaces), and a portion to be illuminated. The portions are secured in a fixed array in which their longitudinal axes are substantially parallel and coplanar. Further, the portions are at least partially immersed in an external medium through which light passes. The one or more materials to be illuminated are contained within the portions of the capillaries.

The system further includes a first light source which is capable of illuminating the array of capillary portions with a first beam of light having an optical axis which is substantially coplanar with and normal to the longitudinal axes of the portions of the capillaries. The portions of the capillaries, when they are illuminated with the first beam of light, form an optical waveguide in which refraction at the outer and inner surfaces of the walls of the portions of the capillaries confines a substantial portion of the light rays which pass through the core of a first capillary in the array to paths that pass through the core of each successive capillary in the array.

Preferably, the system also includes a second light source which is capable of illuminating the array of capillaries with a second beam of light that has its optical axis substantially collinear with the optical axis of the first beam of light, and which is arranged such that the first beam and second beam illuminate the array of capillaries from opposite sides. The light source can include a laser source, and most preferably the first and second light sources include a single laser source which delivers two separate beams through two separate integrated fiber optic transmitters.

Furthermore, the system preferably includes a light collector which is positioned to collect light emitted from the cores of the capillaries. Most preferably, the light collector includes a separate optical fiber for each capillary in the array. The invention also provides criteria to determine which conditions produce a waveguide.

As noted, the present invention also provides a method for simultaneously illuminating one or more materials in limited volumes of the cores of a plurality of capillaries. The method includes the step of providing a plurality of substantially cylindrical capillaries, configured as previously described, which, when filled with materials to be illuminated and when illuminated with a first beam of light having its optical axis substantially coplanar with and normal to the longitudinal axes of the portions of the capillaries, form an optical waveguide in which refraction at the outer and inner surfaces of the walls of the portions of the capillaries confines a substantial fraction of the light rays which pass through the core of a first capillary in the fixed array to paths that pass through the core of each successive capillary in the array. Further, the method also includes the steps of providing the materials to be illuminated and introducing them into the cores of the capillaries and causing a first beam of light to travel along an optical axis which is substantially coplanar with and normal to the longitudinal axes of the portions of the capillaries, such that refraction at the outer and inner surfaces of the walls of the portions of the capillaries confines a substantial fraction of the light rays which pass through the core of a first capillary in the array to paths that pass through the core of each successive capillary in the array.

Preferably, the method also includes the additional step of causing a second beam of light to travel along an optical axis substantially collinear with the optical axis of the first beam of light, such that the first beam and second beam illuminate the array from opposite sides. This preferred additional step permits illumination of different capillaries in the array to be made more nearly uniform. The method preferably further includes the step of collecting light emitted from the cores of the portions of the capillaries. The collecting step preferably includes providing a separate optical fiber for each capillary in the array, with the light-collecting end of each optical fiber being positioned adjacent to the outer surface of the capillary, and the longitudinal axis of the terminal region of each optical fiber at its light-collecting end being positioned substantially normal to the surface of the capillary from which it collects light and substantially in a plane that includes the optical axis of the first beam of illuminating light.

Still further, the present invention provides an assembly for collecting light emitted from one or more materials. The assembly includes a plurality of substantially cylindrical capillaries, each of which has a substantially cylindrical core, a substantially transparent wall, and a portion to be illuminated. The portions are secured in a first fixed array in which their longitudinal axes are substantially parallel and coplanar. The portions are capable of being at least partially immersed in an external medium through which light passes such that, when the portions contain materials to be illuminated, and the first beam of light having its optical axis substantially coplanar with and normal to the longitudinal axes passes through the portions, the portions of the capillaries in the array form an optical waveguide in which refraction at the outer and inner surfaces of the walls of the portions of the capillaries confines a substantial fraction of the light rays which pass through the core of a first capillary in the array to paths that pass through the core of each successive capillary in the array.

Further, the assembly for collecting light also includes a plurality of optical fibers, each of which includes a light-collecting end and a terminal region with a longitudinal axis at the light-collecting end. The terminal regions are secured in a second fixed array in which the longitudinal axes of the terminal regions are substantially parallel and coplanar, and wherein the spacing of the light-collecting ends substantially matches the spacing of the portions of the capillaries in the first fixed array that forms the waveguide. The first and second fixed arrays are configured such that the light-collecting ends of the optical fibers can be positioned to collect light emitted from the cores of the capillaries. In a preferred embodiment, the second fixed array of optical fibers is positionable such that the light-collecting ends of the optical fibers are adjacent to the outer surfaces of the capillaries from which they collect light, and most preferably are substantially normal to the surfaces of the capillaries from which they collect light, and substantially in a plane that includes the optical axis of the first beam of illuminating light.

Preferably, the assembly also includes first and second supports for holding the capillaries and the optical fibers in the first and second arrays. The supports can include V-grooves for receiving the capillaries and the optical fibers. A suitable positioning member can be included for moving the array of optical fibers with respect to the fixed array of capillaries.

As a result, the present invention provides a system for simultaneously illuminating one or more materials in limited volumes of the cores of a plurality of capillaries, which provides efficient illumination of the plurality of capillaries and sensitive detection of emitted photons, with very little cross talk between the light signals collected from different capillaries. Relatively little laser power is required. Such a system is useful for measuring optical properties such as scattering or fluorescence of the contents of each of the multiple capillaries simultaneously. Because the optical sensing system does not need to have any moving parts, it will be particularly useful for rapid measurement of changes in optical properties over time, which in turn is useful for detecting separations of components in samples moving through the capillaries, following the course of reactions within the capillaries, or monitoring time-dependent processes by analyzing samples passed through the capillaries. The present invention further provides a method for simultaneously illuminating one or more materials in limited volumes of the cores of a plurality of capillaries, which can be carried out using the apparatus of the present invention, and can achieve similar benefits. The present invention yet further provides an assembly for collecting light emitted from one or more materials, which can be used to obtain rapid, accurate alignment of large arrays of capillaries with corresponding large arrays of collection optical fibers.

For better understanding of the present invention, together with other and further objects and advantages, reference is made to the following description, taken in conjunction with the accompanying drawings, and its scope will be pointed out in the appended claims.

BRIEF DESCRIPTION OF THE DRAWINGS

FIG. 10(a) is a pictorial, semi-schematic view of an exemplary 12-channel working model of the present invention;

FIG. 10(b) is an enlarged cross-sectional view of the capillary and fiber optic detector array of FIG. 10(a);

DETAILED DESCRIPTION OF THE INVENTION

The present invention provides a method to identify conditions in which multiple capillaries form an optical waveguide in which refraction confines incident light to the cores of successive capillaries in a parallel array. To understand the physical basis for the method, and to guide in selecting conditions where multiple capillaries form a waveguide, the well known paraxial approximation (that light rays are not far from the optical axis) and thin-lens approximation (that the gaps between refracting surfaces can be neglected) are used to describe the optical properties of idealized parallel capillary arrays and illuminating light. Quantitative relationships derived by using these approximations are expected to give predictions that diverge appreciably from exact calculations for the small radii of capillaries but which are useful for indicating how different variables might be manipulated to produce a capillary waveguide and for choosing likely conditions to analyze by exact Snell's law ray-tracing computer programs, which are more difficult to use but which predict much more accurately whether specific configurations will form a capillary waveguide. Finally, methods for constructing a capillary waveguide and a matching set of optical fibers for collecting emitted light are presented, and a working embodiment that is useful for DNA sequencing has been constructed.

Figure 1:
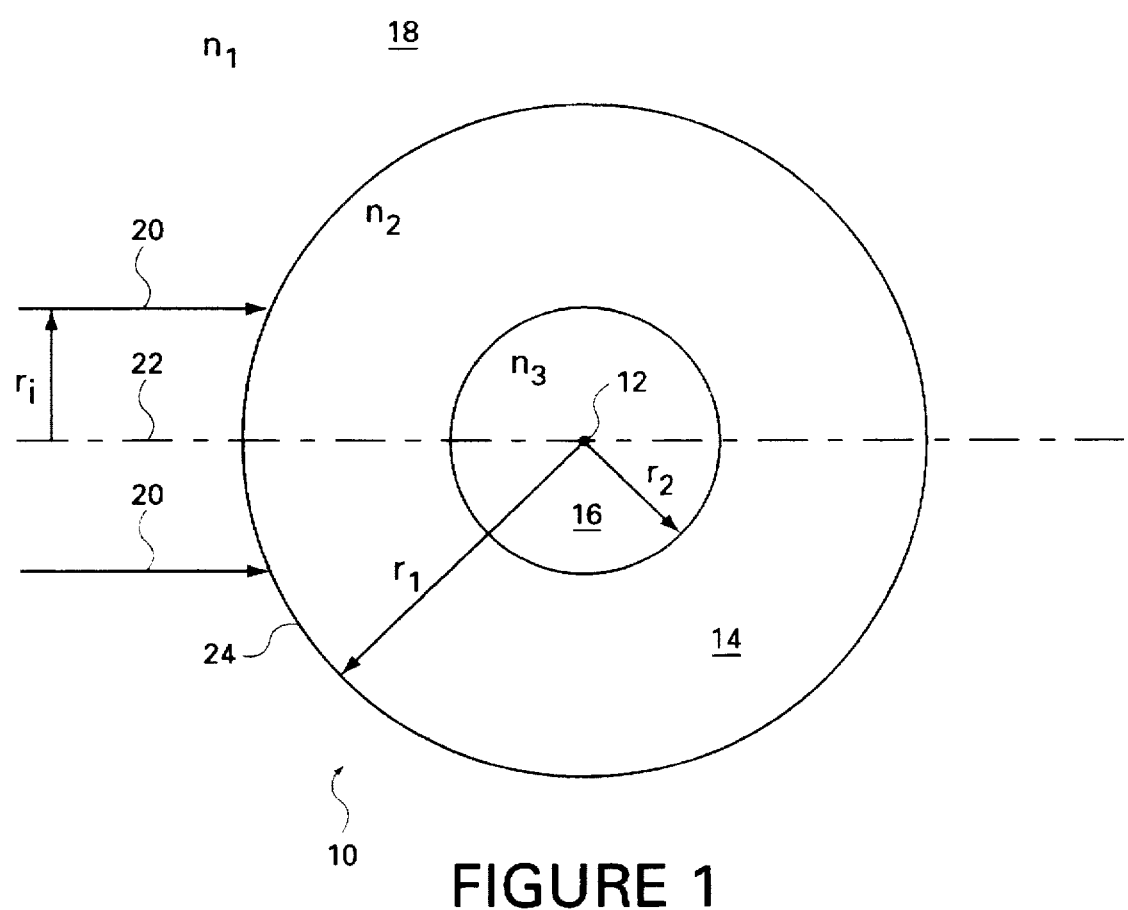
FIG. 1 is a cross-sectional view of a capillary of the present invention, showing relevant parameters.

For definitions, reference should be made to FIG. 1, which depicts a transverse cross section of a capillary 10 suitable for use in the present invention. The capillary has a longitudinal axis 12 (normal to the plane of the paper) and a transparent cylindrical wall 14 that has an outer radius $r_1$ and an inner radius $r_2$, centered on the longitudinal axis 12. The cylindrical wall 14 defines a hollow core 16. The capillary 10 is surrounded by an external, light-transmitting medium (or a vacuum) 18 having an index of refraction $n_1$. The wall 14 has an index of refraction $n_2$, and material contained within the core 16 has an index of refraction $n_3$. A light beam, represented by arrows 20, impinging on the capillary 10 has a radius $r_i$ measured from the optical axis 22.

The most efficient illumination of the core of the capillary 10 through the capillary wall 14 will be when the optical axis 22 of the incident beam 20 is normal to the outer surface 24 of the capillary wall 14. The fraction of the incident light that passes through the core 16 of the capillary will depend on the radius and angular convergence or divergence of the incident beam 20, the outer ($r_1$) and inner ($r_2$) radii of the capillary wall, and the indices of refraction $n_1$, $n_2$, $n_3$ of the external medium 18, capillary wall 14, and material in the core 16, respectively.

According to Snell's law, light passing from one medium into another will be bent according to the equation $$n_i \sin \theta_i = n_r \sin \theta_r \qquad (1)$$

where $n_i$ is the refractive index of the medium through which the incident light travels, $n_r$ is the refractive index of the medium through which the refracted light travels, $\theta_i$ is the angle of incidence and $\theta_r$ the angle of refraction relative to the normal to the surface. Disregarding, for the moment, the small losses due to Fresnel reflection, rays that enter normal to the capillary surface 24 will pass through the wall 14 and core 16 without deflection, but all other rays will be bent at each surface where the refractive index changes. Where $n_1$ and $n_3$ both differ from $n_2$, off-normal rays that pass through the core 16 will be bent at four surfaces: 1) upon entering the capillary wall 14 from the external medium 18; 2) upon entering the core 16 from the wall 14; 3) upon exiting the core 16 into the wall 14; and 4) upon exiting the capillary wall 14 into the external medium 18. The maximum deflection will occur for rays that enter the capillary 10 at the angle farthest from normal. Thus, if those rays pass through the core 16, all rays must pass through the core 16.

Figure 2A:
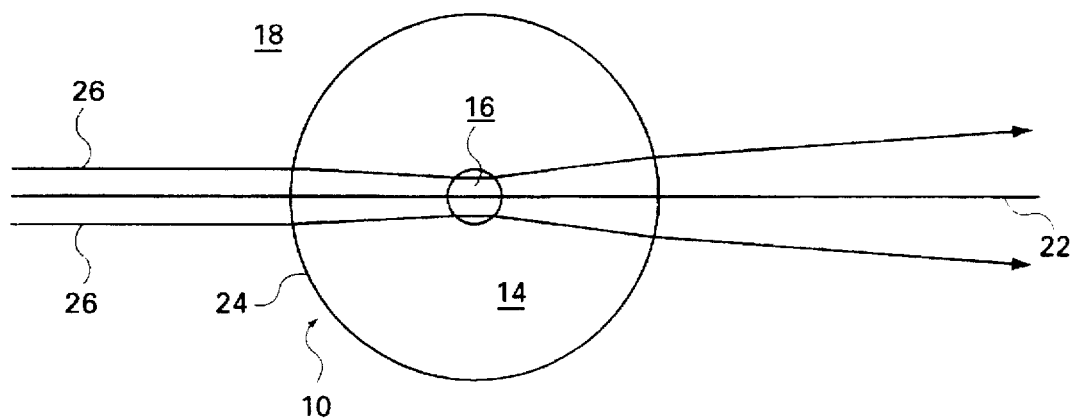
FIGS. 2(a)–2(c) are cross-sectional views similar to FIG. 1, showing respectively divergent, parallel and convergent passage of light beams through the capillary.
Figure 2B:
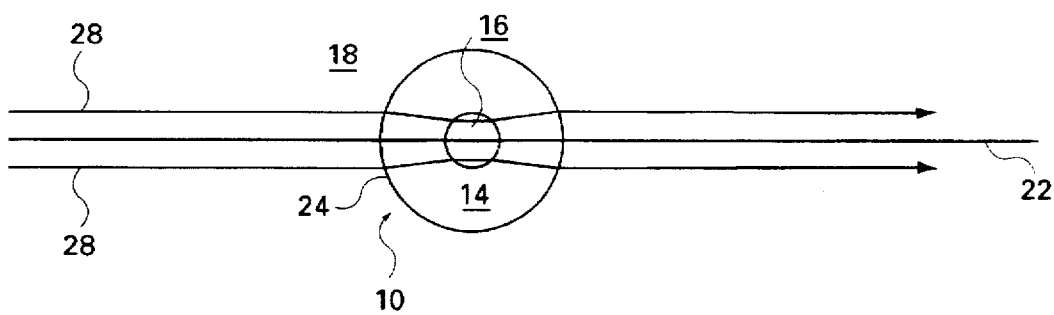
Figure 2C:
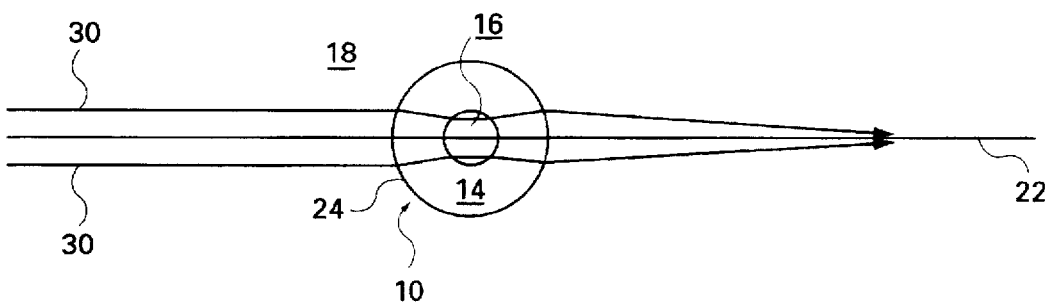

FIGS. 2(a)–2(c) show idealized paths of parallel light rays that enter a capillary 10 a distance $r_i$ (as defined in FIG. 1) from the optical axis 22 of the incident beam and pass through the core 16. Reference characters similar to those in FIG. 1 have been employed. The optical axis 22 is normal to the surface 24 of the capillary 10 and the rays shown are those that enter the capillary 10 at the angle farthest from normal. FIG. 2(a) shows paths of light rays 26 which diverge upon passing through capillary 10; FIG. 2(b) shows paths of light rays 28 which remain parallel upon passing through capillary 10; and FIG. 2(c) shows paths of light rays 30 which converge upon passing through capillary 10.

Figure 3A:
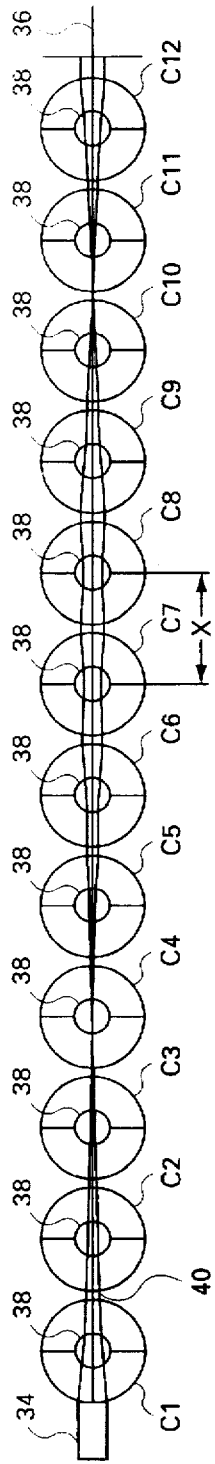
FIG. 3(a) is a cross-sectional view showing passage of a light beam through a capillary array of the present invention, wherein the capillaries have an inside diameter of 100 μm and an outside diameter of 375 μm and form a waveguide.
Figure 3B:
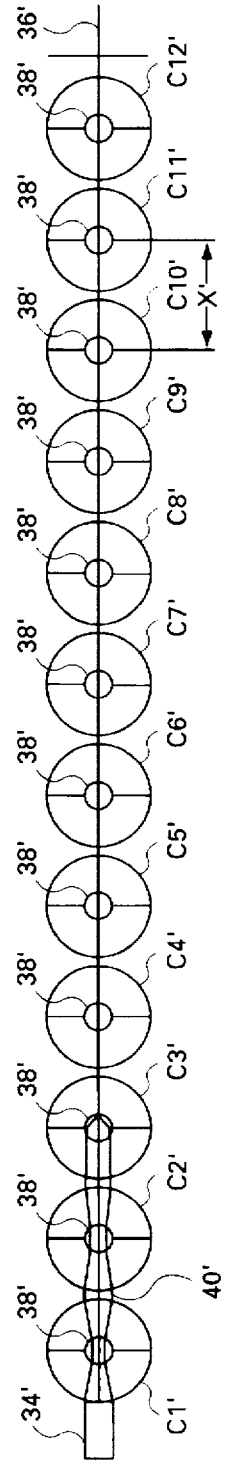
FIG. 3(b) is a view similar to FIG. 3(a) for capillaries having an inside diameter of 75 μm and an outside diameter of 375 μm but which do not form a waveguide.
Figure 3C:
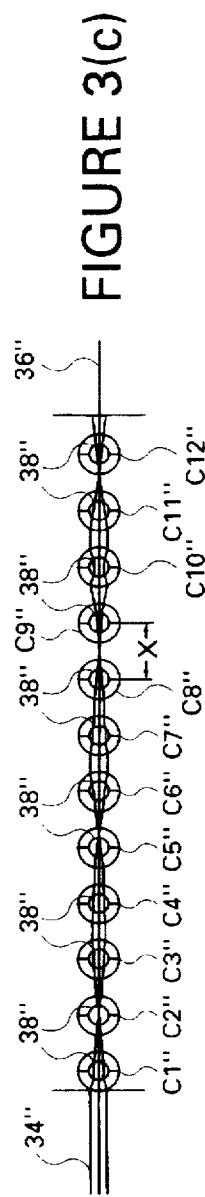
FIG. 3(c) is a view similar to FIG. 3(a) for capillaries having an inside diameter of 75 μm and an outside diameter of 150 μm which form a waveguide.
Figure 3D:
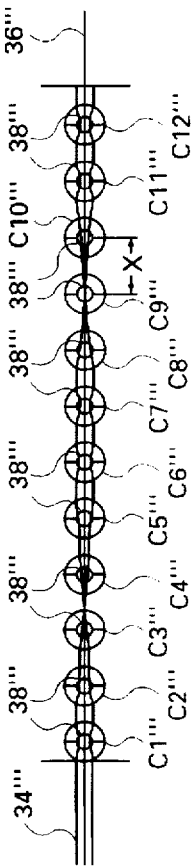
FIG. 3(d) is a view similar to FIG. 3(a) for capillaries having an inside diameter of 50 μm and an outside diameter of 150 μm which form a waveguide.

FIG. 3(a) shows a cross section of a flat parallel array 32 of identical, equally spaced capillaries C1–C12 illuminated with an idealized, cylindrical, perfectly parallel beam of light 34 that is centered normal to the first capillary C1 and in the plane of the capillary array. The plane of the capillary array passes through the central axes of the capillaries; in FIG. 3(a), it passes through line 36 and is perpendicular to the plane of the paper. Each capillary C1–C12 in the array 32 is an equivalent optical element of four refracting surfaces. Because the capillary surfaces are cylindrical, light rays in any plane that is normal to the central axes of the capillaries (that is, parallel to the plane of the paper) will remain in that plane and be bent only toward or away from the plane of the array. In this ideal case, the approximate conditions for confining the beam to the core 38 of each successive capillary C1–C12 in the array 32 are that 1) all of the light rays that enter the first capillary C1 must pass through its core 38, and 2) the rays that exit the first capillary C1 must illuminate the second capillary C2 with a beam 40 which is no larger or more divergent than the parallel beam 34 that illuminated the first capillary C1. The second condition can be met only if the combined refractive effect of the four surfaces of the capillary C1 is not divergent and if the spacing X between capillaries C1–C12 is appropriate.

The refractive power, p, is a measure of the ability of a curved surface to bend light that crosses the surface and is expressed in the paraxial approximation as:

$$p = \frac{n_r - n_i}{r} = \frac{1}{f} \quad (2)$$

where r is the radius of curvature of the surface, f is the focal length, and $n_r$ and $n_i$ are as defined above for equation 1. By convention, r is taken to be positive for light incident on a convex surface and negative for light incident on a concave surface. Positive values of p indicate convergence, negative values divergence. The paraxial approximation may not be highly accurate for the relatively high curvatures encountered in capillary waveguides, but the equation shows that the absolute value of the refractive power increases with increasing difference in refractive index or with decreasing radius of curvature.

The condition that the combined refractive effect of the four surfaces of the capillary not be divergent may be expressed in the thin lens approximation by the condition that the sum of the refractive power of the four refracting surfaces of the capillary must be greater than or equal to 0:

$$p_1 + p_2 + p_3 + p_4 \geq 0 \quad (3)$$

where $p_1$, $p_2$, $p_3$ and $p_4$ are the refractive powers of the four surfaces of the capillary crossed by the beam, calculated according to equation 2. The geometry of a capillary is such that the two surfaces encountered by entering light are both convex and the two surfaces encountered by exiting light are both concave. Combining equation 2 with relationship 3, a necessary condition (within the context of the paraxial and thin lens approximations) for establishing a capillary waveguide can be expressed as:

$$\frac{n_2 - n_1}{r_1} \geq \frac{n_2 - n_3}{r_2} \quad (4)$$

where all of the parameters have been previously defined in FIG. 1.

For typical analytical uses, the refractive index of the wall of a fused silica capillary is 1.46, of air is 1.0, of water is 1.33, and of aqueous solutions is equal to or greater than 1.33 and less than 1.46. For all conditions where both $n_2 > n_1$ and $n_2 > n_3$ (that is, the conditions typical for electrophoretic or chromatographic separations), all terms will be positive and relationship 4 can be rewritten:

$$1 < \frac{r_1}{r_2} \leq \frac{n_2 - n_1}{n_2 - n_3} . \quad (5)$$

Considering the absolute physical constraint that the outer surface radius $r_1$ must be larger than the inner surface radius $r_2$, relationship 5 can be satisfied only when $$n_3 > n_1 \quad (6)$$

Thus, a requirement for forming a capillary waveguide when $n_1$ and $n_3$ are both less than $n_2$ is that the refractive index $n_3$ of the material in the core must be greater than that of the external medium $n_1$. This requirement is readily understood in physical terms. Under these conditions, the two outer surfaces of a capillary will both be convergent and the two inner surfaces both divergent to a beam passing through the capillary. Since the radius of the core is necessarily smaller than the radius of the outside surface of the capillary, equation 2 shows that the divergence contributed by the inner surfaces will be greater than the convergence contributed by the outer surfaces unless the difference in refractive index between the wall and the external medium is greater than the difference in refractive index between the wall and the material in the core.

Relationship 4 may also be used to consider the possibility of forming capillary waveguides where other refractive index differences across the surfaces apply, as might be encountered with exotic materials or specialized uses. Relationship 4 cannot be satisfied for any condition where both $n_2 < n_1$ and $n_2 > n_3$, because the larger side of the inequality in relationship 4 will always be negative and the smaller side always positive. The inability to satisfy this relationship is readily understood because, under these conditions, all four capillary surfaces would be diverging and a beam could not be confined.

The opposite situation, where all four capillary surfaces would be converging, would obtain where both $n_2 > n_1$ and $n_2 < n_3$. In this case, relationship 4 will always be satisfied, because the larger side of the inequality in relationship 4 is always positive and the smaller side always negative.

The remaining possible inequalities in refractive index across the capillary surfaces are when both $n_2 < n_1$ and $n_2 < n_3$. In this case, the numerators of relationship 4 are both negative, and relationship 4 can be rewritten:

$$\frac{r_1}{r_2} \geq \frac{n_2 - n_1}{n_2 - n_3} . \quad (7)$$

Since $n_3$ and $n_1$ are both greater than $n_2$, relationship 7 is satisfied whenever $n_3 \geq n_1$ but also for some conditions where $n_3 < n_1$. Again, these relationships may be understood in physical terms. When both $n_3$ and $n_1$ are greater than $n_2$, the two outer surfaces of a capillary will both be divergent and the two inner surfaces both convergent to a beam passing through the capillary. Since the radius of the core is necessarily smaller than the radius of the outside surface of the capillary, equation 2 shows that the convergence contributed by the inner surfaces will be greater than the divergence contributed by the outer surfaces when $n_3 \geq n_1$ and, depending on the values of $r_1$ and $r_2$, for some range of values of $n_3 < n_1$. Prediction of whether a particular beam would actually be confined under a particular set of conditions is best analyzed with the help of an exact Snell's law ray-tracing program, as discussed in more detail below.

Index matching across either capillary surface may also be considered in light of relationship 4. With index matching at the outer surface, that is, $n_2 = n_1$, relationship 4 is satisfied only when $n_2 \leq n_3$, that is, when the inner surfaces are index matched or converging. With index matching at the inner surface, that is, $n_2=n_3$, relationship 4 is satisfied only when $n_2 \geq n_1$, that is, when the outer surfaces are index matched or converging.

In usual situations where capillaries are used for analysis, $n_2$ is greater than both $n_1$ and $n_3$, and under these conditions relationship 5 may be used as a guide to constructing planar arrays of capillaries which will support beam confinement, in much the same way as one uses a formula such as the lensmaker equation as a guide in fabricating lenses. For example, to build a capillary waveguide in air ($n_1=1.0$) with silica capillaries ($n_2=1.46$) containing dilute aqueous solutions ($n_3 \sim 1.33$), the ratio $r_1/r_2$ should be less than approximately $0.46/0.13=3.54$. Immersing the planar capillary array in water would increase $n_1$ to 1.33, thereby reducing Fresnel reflection (discussed below), but would require a substantially higher internal refractive index $n_3$ to support confinement. For $n_3=1.40$ and $n_1=1.33$, relationship 5 predicts that $r_1/r_2$ must be less than approximately $0.13/0.06=2.17$ to support confinement.

Figure 5:
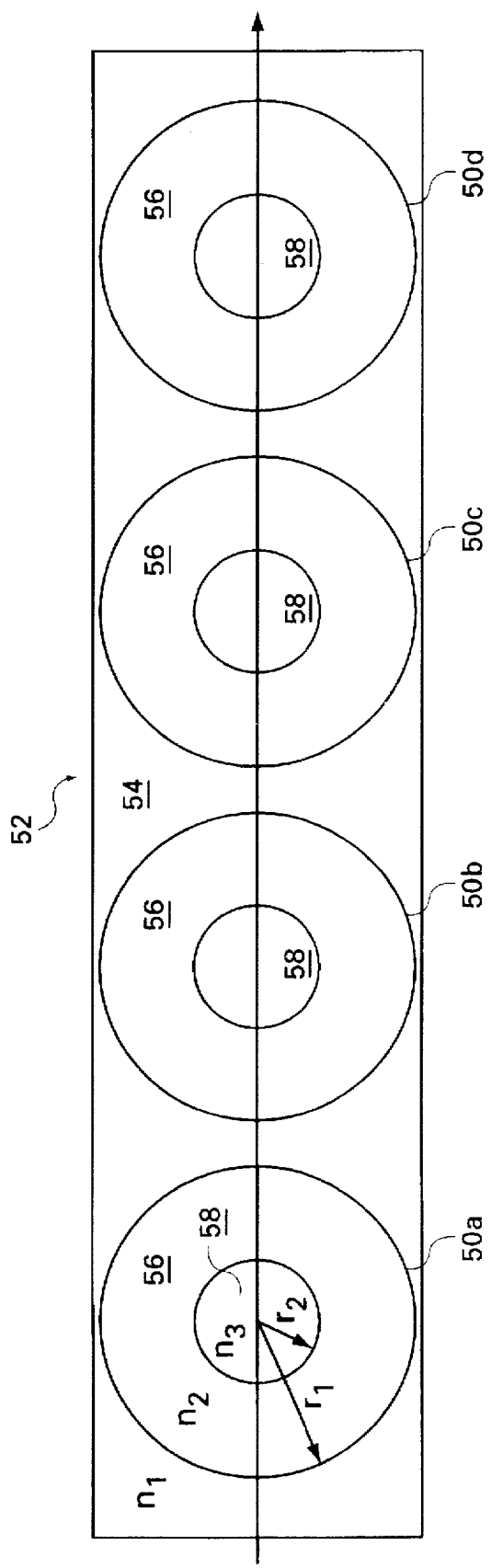
FIG. 5 is a partial cross-sectional view of a capillary array of the present invention, immersed in an external medium.

FIG. 5 depicts the first four capillaries 50a–50d of a multi-capillary array 52 in which the capillaries are immersed in an external medium 54 such as a liquid. Medium 54 can also be, for example, a gas or a vacuum. Capillaries 50a–50d include walls 56 defining cores 58. Parameters $n_1$, $n_2$, $n_3$, $r_1$ and $r_2$ are as defined above in FIG. 1. Capillaries may also be partially immersed, if the external medium occupies all of the space through which light rays pass in travelling through the capillaries in the array.

It should be borne in mind that changes in concentration of materials being analyzed may change the refractive index $n_3$ of the material in the core 58, and conditions should be selected that will support beam confinement over the full range of refractive indices to be encountered in use of the system. For the typical case where $n_1$ and $n_3$ are both less than $n_2$, transient increases in $n_3$ as materials being analyzed pass through the beam will decrease divergence at the inner surfaces and therefore are unlikely to disrupt confinement of the beam in a capillary waveguide.

It will be appreciated that the above relationships can provide guidance as to which values of $n_1$, $n_2$, $n_3$, $r_1$, and $r_2$ will be likely to confine a parallel beam of sufficiently small radius $r_i$ and sufficiently small divergence. A Snell's law ray-tracing computer program such as Optec III (available from Sciopt Enterprises, San Jose, Calif.) can be used to calculate exactly what fraction of an incident beam of a particular radius and divergence will be confined to pass through the cores of successive capillaries in a parallel array of defined spacing. Such calculations show that waveguides can be formed with commercially available capillaries under conditions typically used for analytical separations. Snell's law ray-tracing computer programs, and their manner of use for analyzing optical systems, are well known in the art.

Fused silica capillaries in a range of sizes and $r_1/r_2$ ratios are commercially available from Polymicro Technologies, Inc., Phoenix, Ariz., for example. Capillaries typically come with a 12 µm or 16 µm cladding of polyimide, which must be removed from the portion of the capillary that is to be arrayed in the waveguide. The cladding is easily removed mechanically or by burning, for example. A convenient way to make capillary arrays for testing beam confinement is to remove cladding from a limited portion some distance from the ends of each capillary and then to align the capillaries on a flat surface with their long axes parallel so that the cladding of neighboring capillaries is in contact on either side of the cladding-free portions, which are then separated by twice the thickness of the cladding. The dimensions of commercial capillaries and cladding are uniform enough to be able to form and test capillary waveguides readily in this way.

Preferably, spacing X between capillaries (refer to FIG. 3(a)) should be as close as convenient. Cladding-free capillaries could be as close as having their outer walls touching. For capillaries with cladding, the walls of the cladding-free portions that form the waveguide will usually be separated by at least twice the thickness of the cladding. Even larger spacings will usually be acceptable, as ray tracing predicts beam confinement with spacings as large as several capillary diameters with commercial capillaries under typical conditions of use. Theoretically, confinement should not be achieved when spacing becomes large enough that rays passing through the first capillary C1 cross the optical axis (line 36) closer to the first capillary C1 than the midpoint between the centers of the first two capillaries C1 and C2, but in practice, the spacing usually must be considerably closer than this.

Since relationships 4, 5 and 7 are based on the paraxial and thin-lens approximations, they are expected to give less accurate predictions of whether particular configurations will form a waveguide than are provided by an exact ray-tracing program. After using any of these relationships to decide on a desirable set of parameters, a ray-tracing program may be used to provide a more precise assessment of what fraction of an incident beam of a particular $r_i$ and divergence (or convergence) will be expected to be confined by a hypothetical capillary waveguide having anticipated values of $r_1$, $r_2$, $n_1$, $n_2$, and $n_3$ at different capillary spacings X. If the conditions selected are predicted not to confine the beam, the relationships 4, 5 or 7 provide guidance on what parameters to adjust to achieve confinement. The final test of whether satisfactory beam confinement is achieved is to test an actual capillary array, which is easily done as described above.

Figure 4:
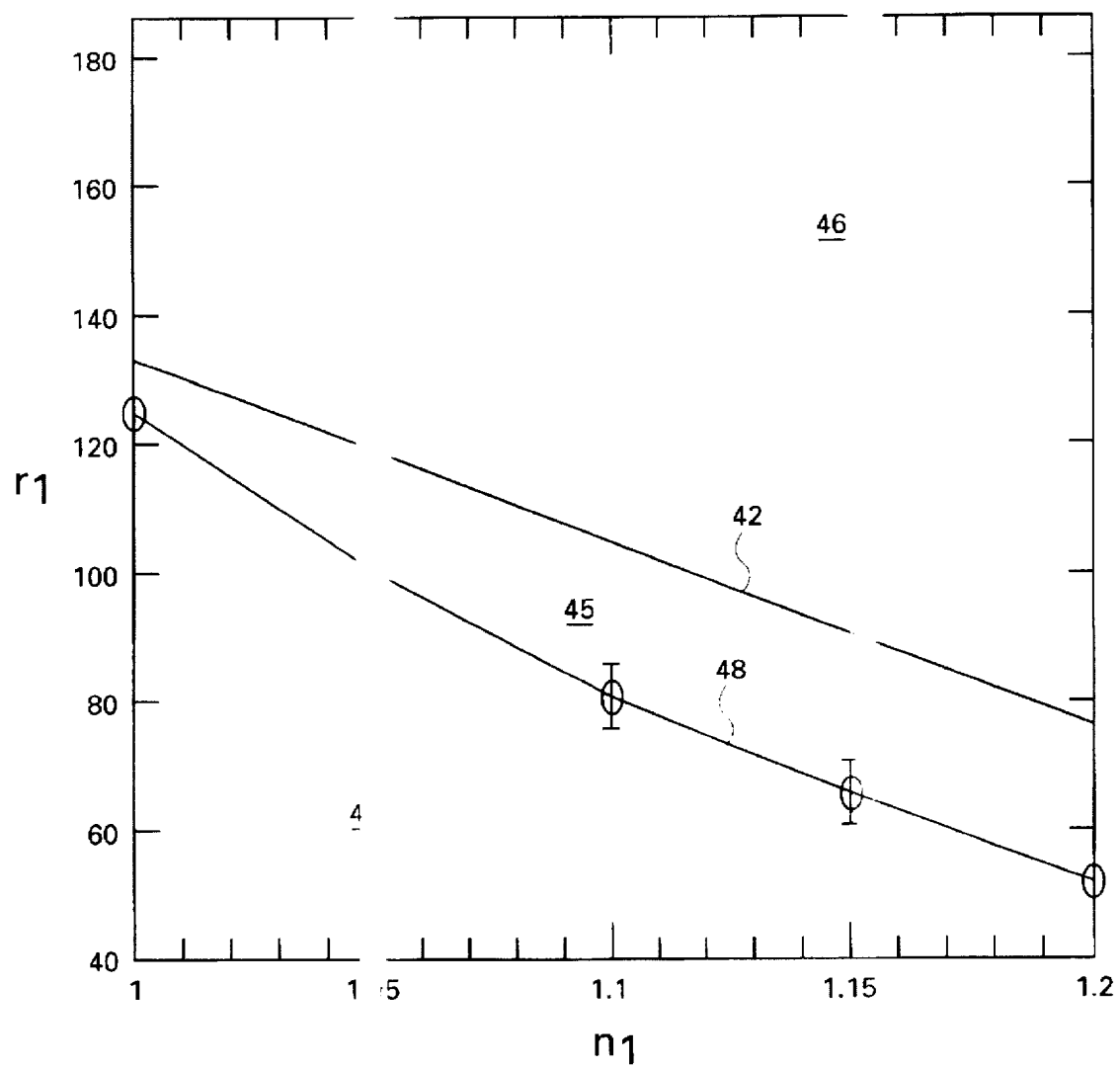
FIG. 4 is a plot of the boundary between conditions of confinement and nonconfinement based on two different calculation methods.

FIG. 4 provides an example of the differences in confinement conditions predicted by relationship 5 and the exact ray-tracing program Optec III. In this case $r_1=r_2=37.5$ µm, $n_2=1.46$, $n_3=1.33$ (the value for dilute aqueous solutions), and the spacing X between capillary centers used in the ray-tracing program $=2 \times r_1+1$ µm. The incident beam is assumed to be parallel (that is, neither converging nor diverging). Combinations of values of $n_1$ and $r_1$ that define the boundary between conditions of confinement or nonconfinement under these conditions are plotted in FIG. 4, where curve 42 shows the values that produce equality in relationship 5 (or in relationships 3 or 4) and the points on curve 48 are the results of calculations by the ray-tracing program. The error bars extend from the highest values of $r_1$ calculated to give confinement to the lowest values calculated not to give confinement at particular values of $n_1$, and curve 48 is drawn through the averages between these values.

Combinations of values of $n_1$ and $r_1$ that lie on or below a line are predicted to confine the beam, and combinations that lie above the line are predicted not to confine the beam. As expected, the two predictions are similar but not identical, and estimates from the paraxial and thin-lens approximations (curve 42) deviate further from the exact case (approximated by curve 48) the smaller the radius of curvature. Region 44 designates those combinations of $n_1$ and $r_1$ where both calculation techniques predict confinement; region 46 designates those combinations where neither technique predicts confinement, and region 45 designates those combinations where relationship 5 predicts confinement but ray tracing does not.

It will be apparent that conservative use of relationships 4, 5 or 7 can guide the construction of capillary waveguides that will confine a large fraction of an incident beam for a considerable range of conditions typically used for analysis of samples in capillaries.

When the conditions for beam confinement are met, the refracted light will be confined to the cores of successive capillaries indefinitely (i.e., even for a large number of capillaries). For typical analytical uses of capillaries, little light is lost due to absorption by the contents of the capillaries. The only significant loss of light should be due to Fresnel reflections at the surfaces, although beam divergence in the plane of the capillaries could cause a reduction of intensity (both effects will be considered below). Under conditions of confinement, the effective focal length of the combined optical elements in a parallel array of capillaries is typically a few capillary spacings long, as illustrated in FIGS. 3(a), 3(c), 3(d), 7(b) and 9.

FIGS. 3(a)–3(d) depict four different parallel arrays 32, 32', 32" and 32'" of 12 commercially available capillaries, all made of fused silica ($n_2=1.46$). C1–C12 have an outside radius $r_1=187.5$ µm, an inside radius $r_2=50$ µm, and a ratio $r_1/r_2=3.75$; C1'–C12' have an outside radius $r_1=187.5$ µm, an inside radius $r_2=37.5$ µm, and a ratio $r_1/r_2=5$; C1"–C12" have an outside radius $r_1=75$ µm, an inside radius $r_2=37.5$ µm, and a ratio $r_1/r_2=2$; and C1'"–C12'" have an outside radius $r_1=75$ µm, an inside radius $r_2=25$ µm, and a ratio $r_1/r_2=3$. The capillaries are assumed to be filled with water ($n_3=1.33$) and surrounded by air ($n_1=1.0$) as the external medium. Parameters $n_1$, $n_2$, $n_3$, $r_1$ and $r_2$ are as defined in FIG. 1. The spacing X between centers of neighboring capillaries is assumed to be $2r_1+40$ µm in all cases. The paths shown for the parallel rays 34, 34', 34" and 34'" that enter the first capillary C1, C1', C1" and C1'" 25 µm above and below the plane of each capillary array were calculated for these conditions by the Optec III ray-tracing program. For these conditions, relationship 5 predicts beam confinement at ratios $r_1/r_2 \leq 3.54$. Note that similar items in FIGS. 3(a)–3(d) are numbered identically, except that a single "prime" is used in FIG. 3(b), a double "prime" in FIG. 3(c), and a triple "prime" in FIG. 3(d).

As in FIG. 4, predictions from the paraxial and thin-lens approximations agree approximately with those from exact ray tracing but not exactly. The ray tracing and relationship 5 agree that arrays 32" and 32'" form a waveguide that confines the beam to the core of each capillary in the array but that array 32' does not. However, the two predictions disagree for array 32, where the ray tracing predicts confinement but relationship 5 does not. As expected, the prediction from ray tracing was correct, as demonstrated by beam confinement in the 12-capillary apparatus described below, which uses capillaries the same size as those in array 32.

In FIG. 4, relationship 5 predicted confinement in regions of parameter space where ray tracing predicted no confinement, whereas for array 32, relationship 5 predicted no confinement where ray tracing predicted confinement. The opposite predictions of relationship 5 and the exact Snell's law ray-tracing program under different conditions close to the boundary between confinement and nonconfinement are presumably due to differing effects in different regions of parameter space of the paraxial and thin-lens approximations used to derive relationship 5.

Figure 9:
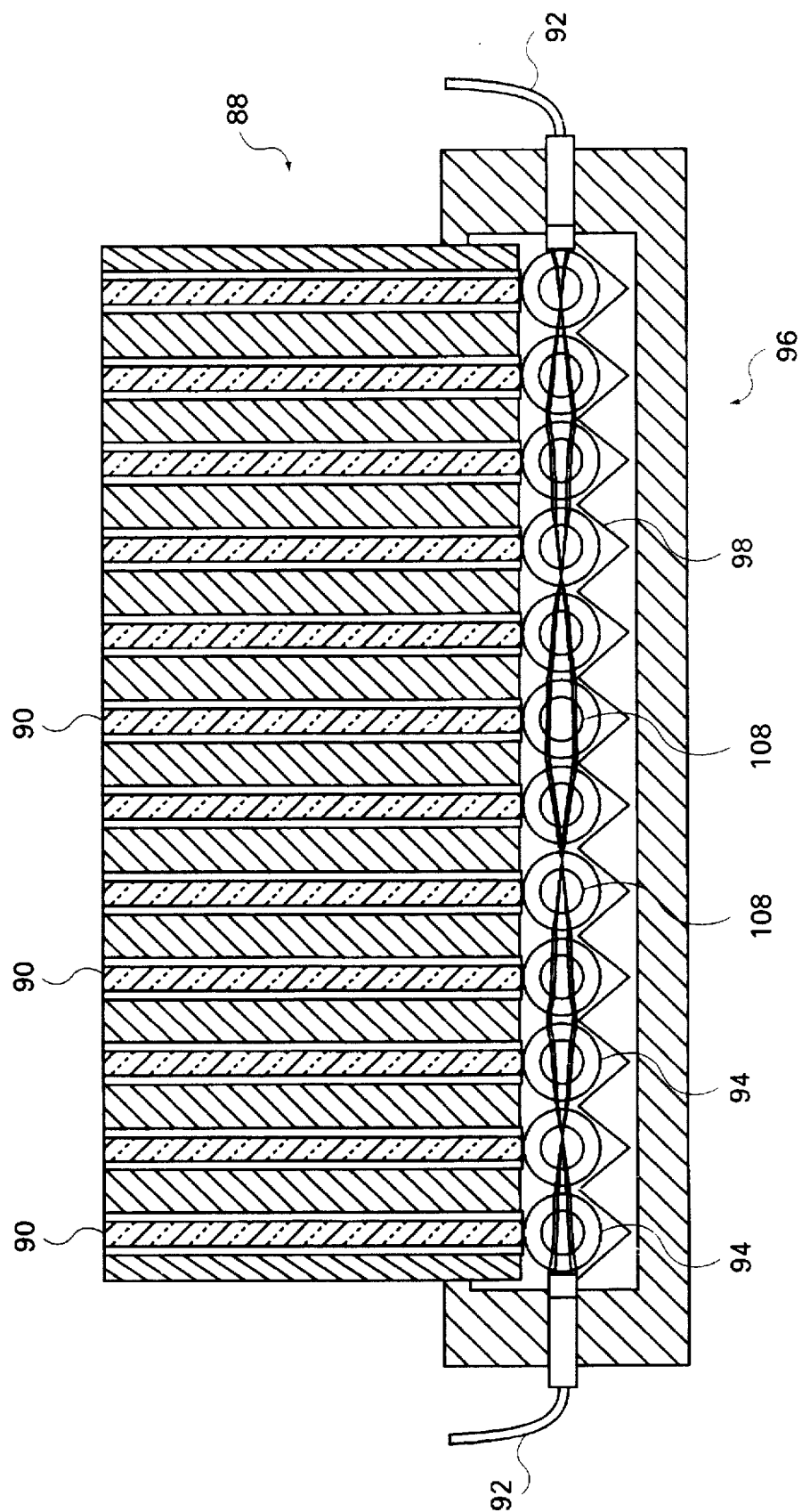
FIG. 9 is a cross sectional view of a capillary and fiber optic detector array of the present invention.
Figure 11A:
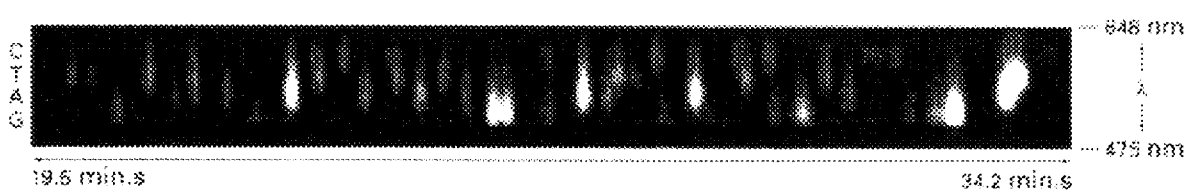
FIGS. 11(a)–11(l) are full fluorescence spectra of dye-labeled DNA molecules detected in sequence from capillaries of the model of FIG. 10(a)
Figure 11B:
Figure 11C:
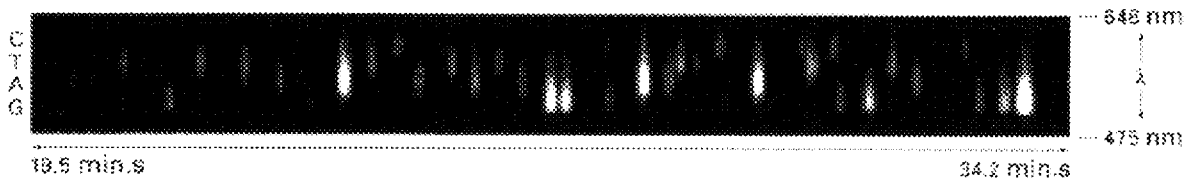
Figure 11D:
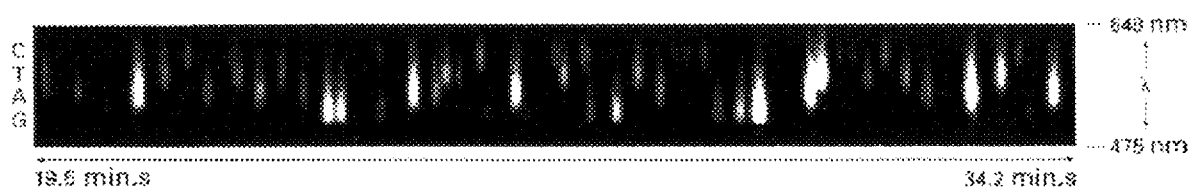
Figure 11E:
Figure 11F:
Figure 11G:
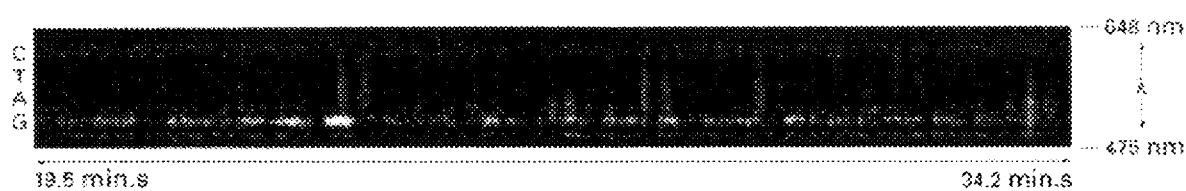
Figure 11H:
Figure 11I:
Figure 11J:
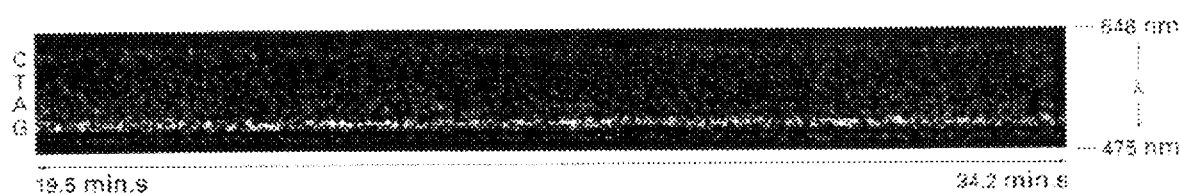
Figure 11K:
Figure 11L:

Referring to FIG. 1 for definitional purposes, and also to FIG. 9, to obtain confinement of the entire beam, the radius $r_i$ of the incident beam 20 should usually be comparable to or less than $r_2$, the radius of the capillary core 16, and the divergence should be as little as possible. Achieving a nearly parallel incident beam 20 with a radius $r_i$ comparable to the radius $r_2$ of the core 16 of analytical capillaries, typically 50 µm or less, is difficult. For laser illumination, the product of the beam radius $r_i$ and its divergence is essentially constant and proportional to the wavelength of the incident light. Because of this inverse relationship, laser beams useful for illuminating capillary waveguides will represent a compromise between beam spot size and divergence. For example, a beam with a radius $r_i$ of 50 µm has a theoretical minimum divergence angle of 0.2 degrees at a wavelength of 514 nm. To attain a divergence angle of 0.1 degrees at this wavelength would require a beam radius of 94 microns, considerably larger than the size of the capillary core 16 typically used. Although this would permit reduction of beam divergence, only that fraction of the incident beam that passes through the core of the first capillary is expected to be confined, and the unconfined light will contribute increased background due to unwanted refractions and reflections.

A bulk optics solution to produce the required incident beam characteristics using a beam expander and an appropriate converging lens can be found. However, the resulting transmission system is cumbersome and does not lend itself to providing illumination from both sides of a multicapillary array. Additionally, elaborate beam control is required to achieve alignment. Consequently, while such a bulk optics solution is within the scope of the present invention, an alternative approach employing an integrated fiber optic transmitter (IFOT) is preferred.

Figure 6A:
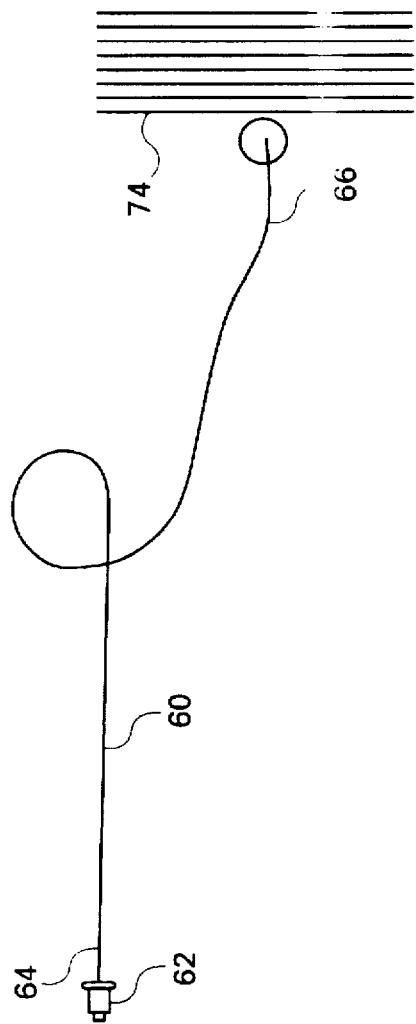
FIG. 6(a) is a view of a laser illumination system of the present invention employing an Integrated Fiber Optic Transmitter (IFOT)
Figure 6B:
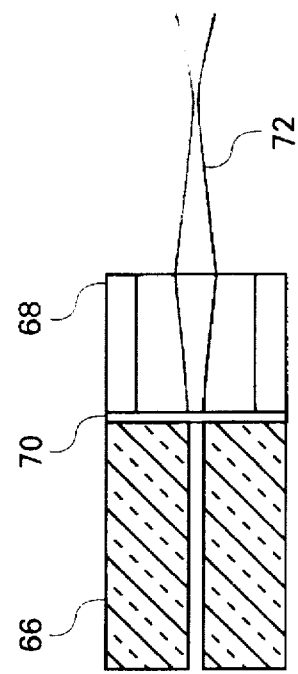
FIG. 6(b) is a detailed view of the IFOT of FIG. 6(a)

As illustrated in FIG. 6(a), an IFOT exploits the technology of integrated fiber optics to fabricate a miniature and remote laser beam delivery system. Light from a laser (not shown) is coupled to a single mode optical fiber 60 through an optical connector 62 located at the proximal end 64 of fiber 60. The distal end 66 of fiber 60 is connected via fusion splice 70 to a short length of a gradient index multimode optical fiber 68, as seen in FIG. 6(b). Distal end 66, splice 70 and fiber 68 form the IFOT. The resulting single strand of fiber is mounted into a stainless steel ferrule and polished until the desired beam radius is obtained. Beam 72 (FIG. 6(b)) then impinges on capillary array 74 (FIG. 6(a)). The IFOT used in the 12-capillary apparatus described below has a cylindrical body of diameter 0.032" and is mounted into a kinematic tilt stage that accommodates two axes of rotation, which in turn is mounted into an X-Y-Z positioner. This IFOT provides an incident beam with $r_i=10$ µm and a divergence of 2°. Laser light from a single source can be coupled to a plurality of IFOTs through the use of a 1×N directional fiber optic beam splitter. Further details of IFOT construction are provided in U.S. Patent application Ser. No. 08/514,264 filed on Aug. 11, 1995 by inventors Harbans S. Dhadwal and Kwang I. Suh, the disclosure of which is hereby incorporated herein by reference.

Figure 13B:
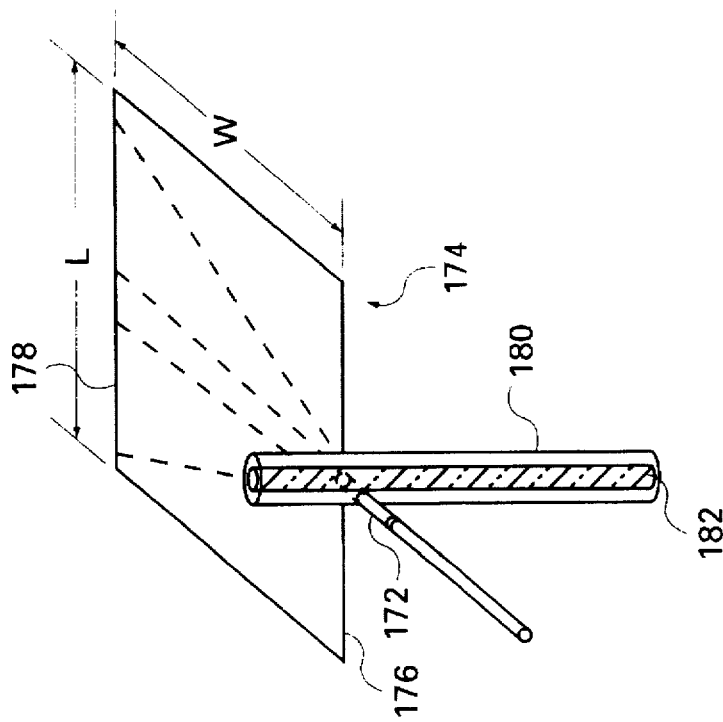
FIG. 13(b) is a view similar to FIG. 13(a) showing correction of such divergence with a cylindrical lens.
Figure 13A:
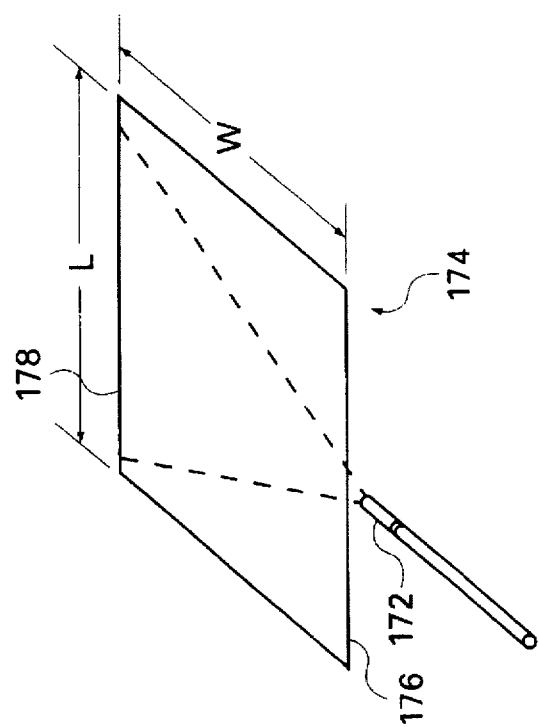
FIG. 13(a) is a perspective, semi-schematic view showing divergence of an illuminating beam in the direction of the longitudinal axes of a capillary array.

Referring now to FIG. 13(a), for most effective illumination of multiple capillaries, the incident beam 172 should diverge as little as possible in the direction L of the long axes of the capillaries (in array 174) in traveling the distance W between the first 176 and last 178 capillaries in the fixed array 174. Although refraction by the curved surfaces of the capillaries may confine the beam entirely to the capillary cores, the capillary array provides no correction of divergence along the length of the capillaries. Divergence beyond the region of the core from which emitted light would be collected would reduce the signal. The 2° divergence of the IFOT used in the 12-capillary model system is small enough that most of the signal is captured by the collectors even for the 12th capillary. However, even this small divergence is large enough that signal will dissipate substantially as arrays become large enough.

Referring now to FIG. 13(b), divergence in the unconfined dimension L may be corrected by placing a cylindrical lens 180 between the illuminating beam 172 and the capillary array 174, with the longitudinal axis of the cylindrical lens 180 perpendicular to the plane of the array 174 and centered on the optical axis of the illuminating beam 172. Capillaries filled with a liquid of appropriate refractive index are preferably used to provide cylindrical lenses 180 of the required dimensions and focal length. The approximate focal length may be calculated by applying equation 2 and relationship 3 to the four surfaces of the capillary forming lens 180, and a more accurate modeling may be obtained with a ray-tracing program. The focus of a capillary cylindrical lens of an appropriate size can be adjusted very precisely to provide optimal illumination for a particular combination of illuminating beam and capillary array simply by changing the refractive index of the internal liquid 182, which can be done, for example, by using different water/glycerol mixtures.

Under conditions of beam confinement, the most significant loss of light as a beam passes through the capillaries in the array will be due to Fresnel reflections at the surfaces. The fraction of incident light reflected, R, is given by $$R = \left[ \frac{n_i - n_r}{n_i + n_r} \right]^2 \quad (8)$$

for light that is normal to the surface, with $n_i$ and $n_r$ defined above. The greater the difference in refractive index across the surface and the farther the ray is from being normal to the surface, the more light will be reflected (except near the Brewster angle for illumination by light polarized parallel to the plane of incidence). Because of the high curvature in small capillaries, the fraction of light reflected will increase significantly with increase in incident beam radius $r_i$. If all of the light were normal to the surface, the fraction of incident light that emerges from the other side of a capillary, T, would be the product of the fraction transmitted at each of the four surfaces:

$$T = \left[ 1 - \left[ \frac{n_1 - n_2}{n_1 + n_2} \right]^2 \right]^2 \left[ 1 - \left[ \frac{n_2 - n_3}{n_2 + n_3} \right]^2 \right]^2 \quad (9)$$

with $n_1$, $n_2$ and $n_3$ as defined above. Equation 9 will underestimate the fraction of a beam transmitted through a capillary by an amount that will depend primarily on the radius $r_i$ of the illuminating beam and the radii $r_1$ and $r_2$ of the capillary. The fraction transmitted through a capillary with air on the outside and water on the inside, according to equation 9, will be 0.92725, and the fraction transmitted through 12 capillaries will be this number to the 12th power, or 0.4040.

The measured fraction transmitted through 12 capillaries in the experimental configuration described below, where the capillaries were in air and contained water, was 0.375, slightly lower than predicted by the equation. The deviation presumably arose primarily because not all light was normal to the surface. Based on the measured value for 12 capillaries, the average fraction transmitted through a single capillary in the experimental configuration can be estimated to be 0.9215. Using this value, the fraction of input light illuminating any capillary arrayed in this experimental configuration can be estimated. For example, the fraction of input light illuminating the 6th capillary will be 0.9215 to the 5th power, or 0.6645, the fraction illuminating the 12th capillary will be 0.9215 to the 11th power, or 0.4069, the fraction illuminating the 24th capillary will be 0.9215 to the 23rd power, or 0.1525, etc.

More uniform illumination of all of the capillaries in a parallel array can be achieved by illuminating coaxially from both sides of the array. In this case, each capillary would receive the sum of the illuminations from each side. Using the above experimental parameters, the 1st and last capillaries in an array of 12 would receive the maximum illumination, 1.4069 times the illumination provided from one of two sources of equal illumination, and the 6th and 7th capillaries would receive the minimum illumination, 1.2768 times. Thus, the minimum illumination would be 90.8% of the maximum when using double illumination, compared with 40.7% in single illumination. The comparable numbers for an array of 24 capillaries are 1.1525 for the maximum illumination and 0.7818 for the minimum, and the minimum illumination is 67.8% of the maximum, compared with 15.3% for single illumination.

Figure 7A:
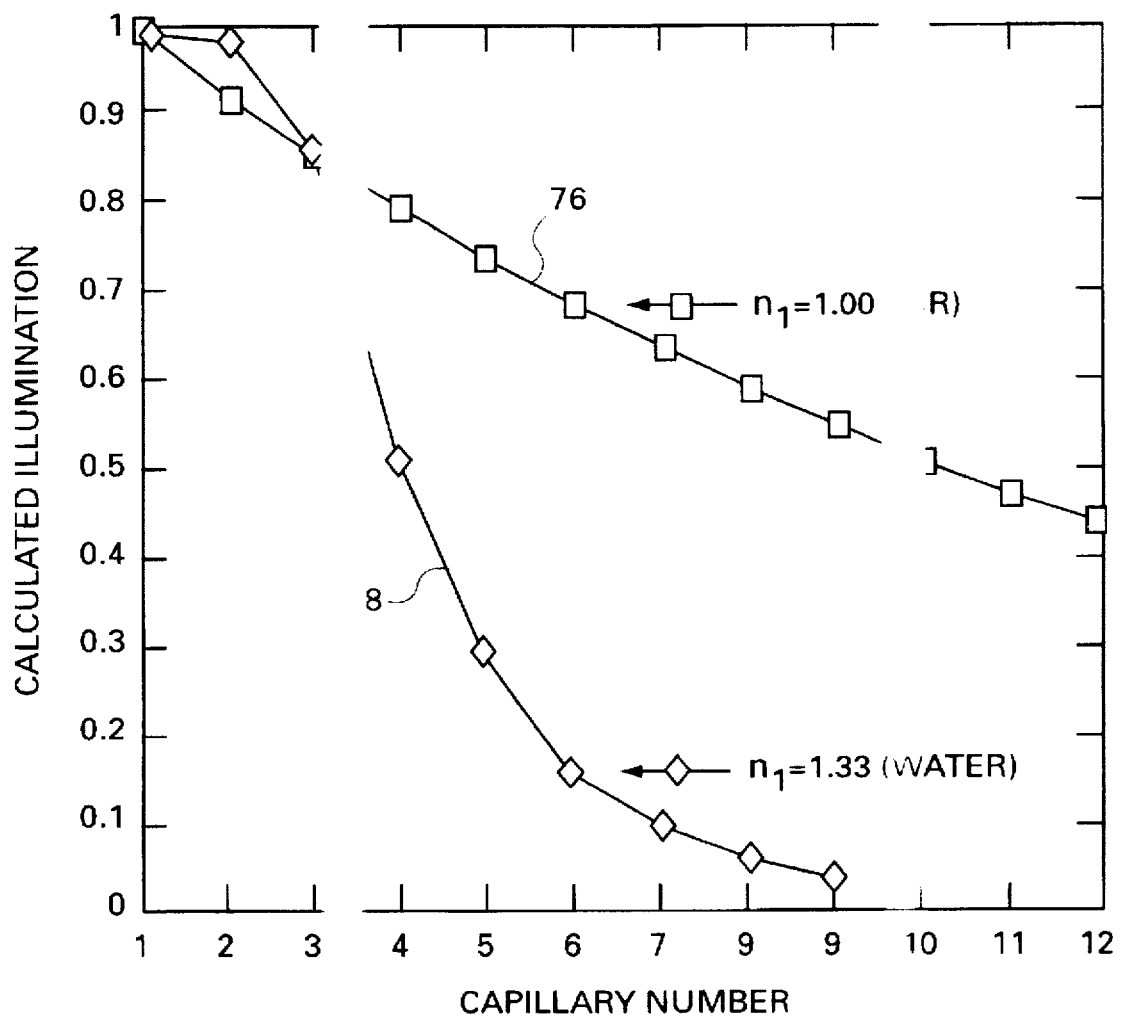
FIG. 7(a) is a plot of calculated illumination versus capillary number for a twelve capillary array immersed in air and in water.

Reflective losses would be reduced by reducing the differences between the refractive indices across the surfaces. However, loss of confinement can cause a much more rapid loss of illumination. This is illustrated in FIG. 7(a), which plots the calculated illumination as a function of capillary number for an array of 12 capillaries which contain water and are immersed in an external medium of air (curve 76, confining, but higher reflective losses) or water (curve 78, lower reflective losses, but not confining). The capillaries are assumed to have $r_1 = 72$ µm, $r_2 = 37.5$ µm, $n_2 = 1.46$ and a spacing between capillary centers of 168 µm. The Optec III ray-tracing program was used to calculate the trajectories of 97 equally spaced rays extending from 25 µm above the plane of the array to 25 µm below the plane of the array, with each ray entering the first capillary parallel to the plane of the array. The points on curves 76 and 78 in FIG. 7(a) plot the product (fraction of the 97 initial rays calculated by the program to be incident on the nth capillary in the array)× (fractional Fresnel loss calculated by equation 9).

Reflective losses are reduced by the lower refractive index difference when water is the external medium, but refractive losses from lack of confinement are much greater: although illumination of the second capillary is higher in the unconfined configuration, illumination of subsequent capillaries in the array declines much faster than in the confined configuration. Illumination of the 9th capillary is 2.9% of the input intensity for the unconfined beam compared with 54.6% when the beam is confined. (Points for capillaries 10–12 are not plotted on curve 78 because the ray on the optical axis was the only one to traverse as far as capillary 10, so larger numbers of rays would need to be traced to obtain a meaningful fraction.)

Figure 7B:
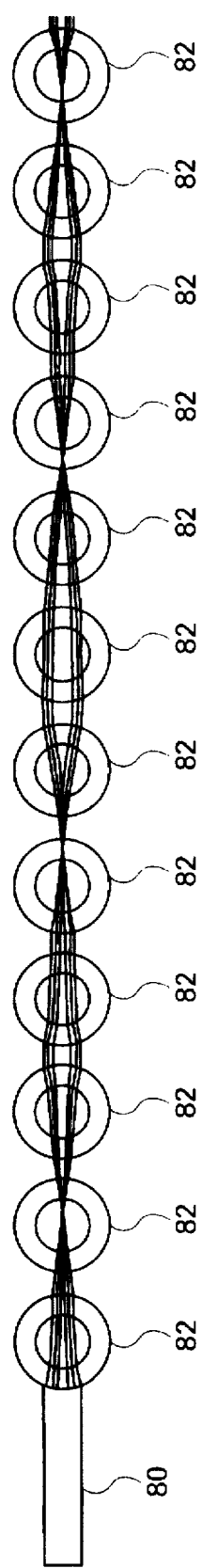
FIG. 7(b) is an illustration of ray propagation through a twelve capillary array immersed in air wherein confinement is attained.
Figure 7C:
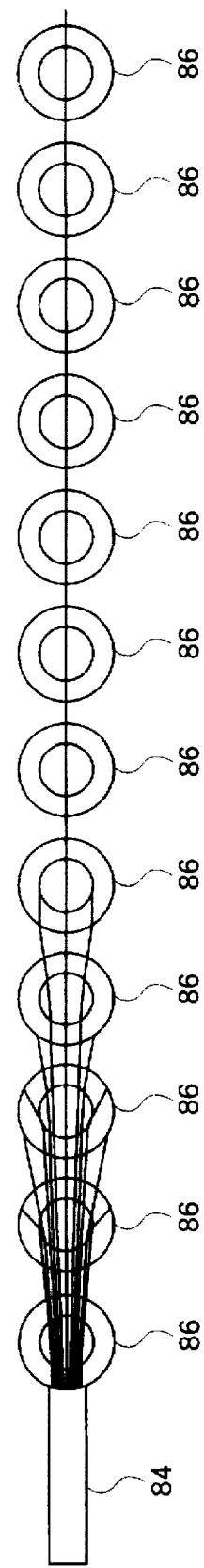
FIG. 7(c) is an illustration of ray propagation through a twelve capillary array immersed in water wherein confinement is not attained.

The plotted trajectory of 11 rays spaced equally from 25 µm above to 25 µm below the plane of the array is depicted for these same configurations in FIG. 7(b) (confined) and FIG. 7(c) (unconfined), considering refractive effects only and neglecting losses from Fresnel reflection. The eleven rays in FIG. 7(b) form a beam designated as 80 which passes through capillaries 82, while the eleven rays in FIG. 7(c) form a beam 84 impinging on the array formed of capillaries 86.

The ideal situation would be to have complete refractive confinement with reflective losses as small as possible. Equation 9 indicates that Fresnel losses will be minimized by making $n_1$ and $n_3$ as close as possible to $n_2$. Capillaries having $n_2$ less than the 1.46 of fused silica would decrease Fresnel losses of capillaries in air but are not readily available. Increasing the refractive index of the external medium would also help, but relationship 5 indicates that the external medium would need to have a refractive index $n_1$ less than about 1.25 to provide beam confinement with commercially available capillaries containing dilute aqueous solutions ($n_3 \sim 1.33$). Materials having a refractive index substantially higher than that of air but less than about 1.25 are not known or not readily available. One available liquid with a refractive index lower than that of water is a Laser Liquid™ (formula code 433) from R. P. Cargille Laboratories, Inc., Cedar Grove, N.J., which has a refractive index of about 1.30. Although this refractive index is only slightly lower than that of water, the refractive index $n_3$ of the aqueous solutions being analyzed could be increased by adding materials such as glycerol, sugars, or the urea, formamide or dimethyl sulfoxide commonly added to solutions used for DNA sequencing, which would allow this Laser Liquid™ or even water to be used as the external medium and still maintain beam confinement.

With either water or the Laser Liquid™ as the external medium, relationship 5 indicates that the smaller the ratio of $r_1/r_2$ of the capillaries being used the smaller the increase in $n_3$ that will be needed to support confinement. A suitable fused-silica capillary that is commercially available has an outside diameter of 164 μm and an inside diameter of 100 μm, a ratio of 1.64. To support confinement in such capillaries with $n_1=1.33$ and $n_2=1.46$, relationship 5 predicts that $n_3$ must be greater than approximately 1.38 whereas ray tracing predicts 1.40 under the conditions specified in detail in the next paragraph; with $n_1=1.30$, relationship 5 predicts $n_3$ must be greater than approximately 1.36 whereas ray tracing predicts 1.38. A refractive index of 1.40 could be obtained with approximately 40% sucrose, 50% glycerol or 8M urea, for example. A variety of organic solvents useful for capillary analysis have refractive indices in the range of 1.4 and higher, and could also support confinement with water as an external medium.

Using the readily achievable conditions $n_1=1.33$, $n_2=1.46$, $n_3=1.40$, $r_1=82$ μm, and $r_2=50$ μm, a center-to-center spacing of 250 μm, and an illuminating beam with $r_1=25$ μm and 2° divergence, ray tracing predicts complete confinement. Assuming only Fresnel losses (calculated using equation 9), the approximate percent illumination of the capillary receiving the least light relative to the capillary receiving the most light may be calculated for single or double illumination of arrays of different sizes: 78.2% and 98.7% for an array of 48 capillaries, 60.9% and 96.5% for an array of 96 capillaries, and 36.8% and 88.3% for an array of 192 capillaries. Actual performance is not expected to be quite as good as predicted by equation 9, but adjustment of refractive indices clearly can have a substantial effect, and construction of useful waveguides containing hundreds of capillaries is feasible. Under these conditions, the main loss of illuminating intensity would be through divergence of the beam along the length of the capillaries, which can be compensated by suitable cylindrical lensing, as discussed above.

In designing and using capillary waveguides, it should be recognized that the efficiency and relative uniformity of illumination will depend on the combined reflective and refractive losses as light passes through the capillary array. The fraction of illuminating light rays that pass through the core of each successive capillary in an array is considered to be substantial if it is approximately equal to or greater than the fraction of rays that pass through the array with air as the external medium under conditions of complete refractive confinement, that is, under conditions where reflective losses will be highest and refractive losses lowest. Equation 9 and FIG. 7(a) curve 76 show that cumulative reflective losses in air can become appreciable even under conditions of complete refractive confinement. In some situations, a liquid external medium may cause a partial loss of refractive confinement but nevertheless confine a substantial fraction of illuminating light rays by producing lower combined reflective and refractive losses than obtained with the same capillary array in air with complete refractive confinement. Although complete refractive confinement will usually be preferable, relationship 4 together with a ray-tracing program and equation 9 provide a framework for making tradeoffs between reduced reflective losses and increased refractive losses in cases where this may be desirable.

An example where confinement is not substantial is illustrated in FIG. 7(a) curve 78 where capillaries having $r_1=72$ μm and $r_2=37.5$ μm containing dilute aqueous solutions were immersed in water. These capillaries are the same size as those used by Lu & Yeung in the above-referenced article from *Applied Spectroscopy*. Lu & Yeung illuminated the capillaries with a focussed laser beam having a diameter about the same as that of the capillary core. Although they analyzed primarily dilute aqueous solutions in capillaries immersed in water (corresponding to curve 78 in FIG. 7(a)), a few of their samples contained 5M urea. As discussed above, a high enough refractive index inside the capillaries can produce confinement of the beam, if the ratio of the outer and inner radii ($r_1/r_2$) is small enough. The solution containing 5M urea used by Lu & Yeung would have had a refractive index of about 1.38. For an array of these capillaries in this configuration, ray tracing predicts that all of the input rays would pass through the core of the first capillary but only about 49% would pass through the core of the 4th capillary, 29% through the core of the 6th capillary, and 4% through the core of the 12th capillary, not including relatively small reflective losses. The refractive losses under these conditions are much greater than the reflective losses with complete refractive confinement in air FIG. 7(a) curve 76) and therefore confinement is not substantial.

As discussed above, reducing the ratio of $r_1/r_2$ will favor confinement. If the above capillaries are replaced by capillaries having $r_1=82$ and $r_2=50$, the $r_1/r_2$ ratio is reduced from 1.92 to 1.64. With water as the external medium and a solution of refractive index of 1.38 inside the capillaries, ray tracing predicts that about 55% of the input rays would pass through the core of the 12th capillary. When reflective losses are included, 51% of the input rays would pass the core of the 12th capillary compared to 42% with complete refractive confinement in air as the external medium. Thus, an internal refractive index of 1.38 produces substantial confinement with water as the external medium in the capillaries with $r_1/r_2=1.64$ but not in those with $r_1/r_2=1.92$. A refractive index greater than about 1.40 would be needed for complete refractive confinement in the former capillaries and 1.43 in the latter, under which conditions more than 94% of input rays would be predicted to pass through the core of the 12the capillary.

As discussed above, illumination of capillaries that form a waveguide is a simple and efficient way to deliver light to the cores of multiple capillaries. In most applications, it is desired not only to illuminate the cores of the multiple capillaries, but also to detect photons emitted by samples within each of the cores of the multiple capillaries. A primary application of the present invention is capillary electrophoresis for DNA sequencing, genetic analysis, medical diagnosis and forensics. In this technique, fluorescent labels are applied to DNA molecules. In response to illumination, the samples produce a fluorescent signal which may be imaged onto a detector through lenses, filters, prisms or in other ways taught in the previous art.

Figure 8:
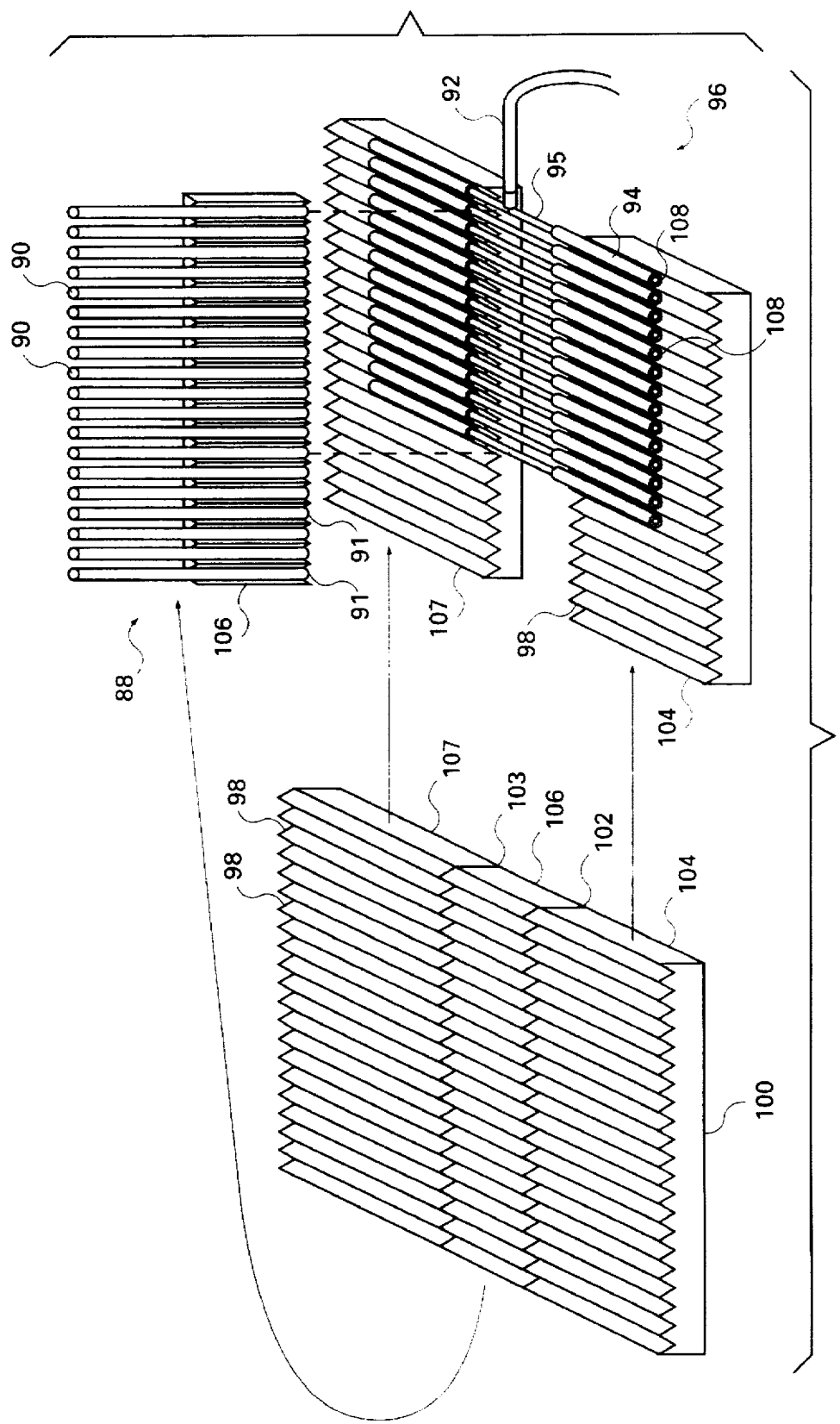
FIG. 8 is an illustration of a method of fabricating a capillary and fiber optic detector array in accordance with the present invention.

Referring now to FIGS. 8 and 9, it will be seen that another aspect of the present invention is a technique to collect the fluorescent signals via a parallel array 88 of optical fibers 90 orthogonal to the illuminating beam provided by the distal end of an IFOT 92 (two IFOTs are shown in FIG. 9). Each optical fiber 90 is normal to the surface of a capillary 94 in a parallel array 96, with the spacing between optical fibers 90 matched to the spacing between the capillaries 94. Capillaries 94 have cores 108.

An advantage of using a dedicated optical fiber 90 to collect light emitted from each capillary 94 is that this configuration should minimize cross talk between the light signals emitted from different capillaries and minimize interference from reflected light. There will be a trade off between efficiency of collection of light from the capillaries and the degree of interference from cross talk and reflection: optical fibers of high numerical aperture will collect light more efficiently but also collect more interference than optical fibers of low numerical aperture. The numerical aperture of the collecting optical fibers 90 could be optimized for the specific application.

Optimum detection requires precise alignment of the collecting end 91 of each optical fiber 90 to the matching capillary 94. Independent position control of each collection fiber 90 is tedious and inefficient. However, any technique by which the spacing between the light-collecting ends of the collection fibers 90 can be made to correspond sufficiently closely to the spacing between capillaries 94 will allow all of the collection fibers 90 to be aligned simultaneously.

One way of achieving the desired alignment resolution is through the use of matched V-grooves 98. The matched V-grooves used in the 12-capillary apparatus described below were produced by machining V-grooves 98 on a surface of a main block 100. The block 100 containing the V-grooves 98 was cut along two lines 102,103 normal to the axes of the grooves 98, producing a matched set of V-grooved surfaces 104,106,107 with identical spacing. The capillaries were mounted across the outer members of the set 104,107, which were fixed in their original orientation on a flat surface. The collection fibers 90 were mounted in the center member of the set 106, which guaranteed that the spacing of the capillaries and the collection fibers was nearly identical.

The collection fibers 90 were mounted permanently with epoxy such that their light collecting ends 91 were close to the cut end 102 of the portion 106 but not recessed within the grooves 98 of portion 106, and the ends 91 were polished. The capillaries 94 were simply clamped in place to allow easy replacement of individual capillaries 94. Alignment of the multiple V-groove fiber optic collection assembly formed by member 106 and fibers 90 with respect to the matched multiple V-groove capillary array assembly formed by members 104,107 and capillaries 94 was accomplished easily with a single X-Y-Z positioner: optimal orthogonal alignment was achieved by monitoring and optimizing the signal from the OH Raman water stretch.

It should be appreciated that production of matched arrays of capillaries 94 and collection fibers 90 is not limited to V-grooves; any manner of holding the collection ends 91 of fibers 90 and the capillaries 94 in sufficiently identical spacing and which allows both unobstructed passage of light through the capillary waveguide and alignment of the collecting fibers with the capillaries is acceptable. Other types of structures for positioning and constraining, including tubular clamps, might be fabricated to the required tolerance. A particular advantage of V-grooves 98 is that they provide two points of contact, stable support, and identical center-to-center spacing for members having a substantially cylindrical shape but different diameters, such as capillaries 94 and fibers 90. Note that in FIG. 9, capillaries 94 are shown as not contacting the sides of the V-grooves 98, and in FIG. 12(b), capillary PCn is shown as not contacting V-groove 170; these are artifacts of the drawing program used, and it is to be understood that normally, each capillary will have a line of contact with each side of its corresponding V-groove. In most instances, the cladding of capillaries 94 contacts the V-grooves and no contact is anticipated in portions 95 where the cladding has been removed (even if blocks 104,107 extended into that area).

Any convenient method can be used to make matched V-groove surfaces 104,106,107. Although machining V-grooves and cutting the resulting block was used to produce the matched set used in the 12-capillary apparatus described below, a mold or photomask would be preferable for manufacturing large numbers of matched V-groove surfaces directly, without the need to cut a block to obtain a matched set. Using multiple essentially identical V-grooved surfaces produced from a mold, for example, a single array of collection fibers could be aligned successively to many different capillary arrays. This would make it convenient to rapidly interchange and align different arrays of capillaries in a fixed illumination and collection apparatus, which might be useful in large-scale DNA sequencing or other large-scale uses of capillary analysis. Sufficiently identical V-groove surfaces might be made cheaply enough that it would be convenient to fix capillaries permanently in them and replace the entire array rather than replacing single capillaries in an array.

Optical fibers 90 are preferably flexible for convenience in delivering the collected light to a detecting device. The collected light may be processed and detected by filters and photomultiplier detectors or in other ways taught in the previous art. In the 12-capillary apparatus described below, the signal from almost any set of fluorescent dyes may be analyzed by passing the fluorescent signals from the optical fibers 90 through a spectrograph which images the fluorescent spectrum from each capillary 94 in parallel onto the surface of a charge-coupled device (CCD).

12-Capillary Embodiment

A 12-channel working model of the present invention was constructed and tested, and is depicted in FIG. 10(a). Laser light from an Argon-ion source 110 was coupled into a single mode optical fiber 112 by a 20X microscope objective 114. The distal end 116 of the single mode optical fiber 112 was coupled to an IFOT 118 of the type described above, fabricated to deliver a Gaussian beam with a waist radius of 10 μm and a divergence of 2°. The IFOT was mounted into a kinematic tilt stage that accommodates two axes of rotation, which in turn was mounted into an X-Y-Z positioner 120 and located at one side 122 of a multiple capillary array 124.

Individual capillaries 126 (100 μm inner diameter, 375 μm outer diameter) were installed in a V-groove assembly 128 made of V-groove surfaces 104,107 (depicted in FIG. 8) fixed to a flat surface. The V-grooves had a spacing of 630 μm. The capillaries were filled with water or aqueous solutions. The IFOT 118 was aligned by observing the far-field shape of the laser beam emanating from the other side 130 of the capillary array 124. Proper alignment was achieved when the far-field pattern was substantially equivalent in size and position with the unobstructed far-field laser beam pattern and the reflections above and below the plane of the capillary array 124 were minimized. With water in the cores of capillaries 126 and air as the external medium, approximately 4.5 mW of the 12 mW laser power incident on the capillary array 124 emerged from the parallel structure, somewhat less than the 4.8 mW expected if all light were normal to the surfaces (as discussed above).

Referring now also to FIG. 10(b), twelve high numerical aperture (NA=0.37) multimode optical fibers 132 with core/cladding diameters of 100/140 were mounted into a matched V-groove fixture 134 (matched to 128) with epoxy and polished. The resulting collection fiber optic array 138 was mounted into a second X-Y-Z translation stage 136 and positioned above and orthogonal to the plane of the capillary array 124 (with the fibers orthogonal to the optical axis of the beam from the IFOT 118). The collection array 138 was aligned with the capillaries 126 by optimizing the signal from the Raman scattering from the water molecules contained in the interior core region 140 of any one of the 12 capillaries 126. Because of the matched V-grooves, all other capillary/fiber pairs were in synchronous alignment. This was confirmed by simultaneous recording of the Raman signal from all 12 channels.

Optical signals collected from the interior core region 140 of each capillary 126 can be detected and processed using any of several techniques, ranging from dedicated photodetectors/optical filters for each collection fiber channel to the arrangement used here, where optical signals are transmitted to a spectrograph 142 and the fluorescent spectrum from each of the 12 capillaries 126 is detected by a CCD system 144. These spectral signals are repetitively read out and subsequently analyzed, for example, by computer 146 to give the sequence of DNA.

The 12-capillary system depicted in FIGS. 10(a) and 10(b) was tested by analyzing 12 parallel DNA sequencing reactions. The coated capillaries were filled with a solution of 4.0% weight-to-volume polyacrylamide (manufacturer's catalog number 02806, 5–6 MDaltons, available from Polysciences, Inc. of Warrington, Pa.), 3.5M urea (available from BioRad of Hercules, Calif.), 40 mM Tris (BioRad) and 40 mM TAPS (available from Fluka of Long Island, N.Y.). DNA reaction samples, after processing and dissolving in formamide, were simultaneously loaded by electrokinetic injection from 12 wells of a 96-well microtiter plate 148. After injection, the DNA samples in the 12 wells were replaced with a running buffer (40 mM Tris, 40 mM TAPS and 3.5M Urea). Vessel 150 contained the same running buffer throughout pre-electrophoresis, sample injection, and data collection.

FIGS. 11(a)–11(l) present the simultaneous acquisition of the full fluorescence spectra of dye-labeled DNA molecules from all 12 capillaries as a function of time. The horizontal axis indicates the time, from 19.5 to 34.2 minutes, after electrokinetic injection of the DNA samples; all pixels sharing a vertical axis represent a time slice of full spectral information obtained from all 12 capillaries in an 0.29 second interval. The vertical axis for each capillary represents the wavelength for fluorescence emission and spans the range from 475 nm to 648 nm. Lighter shading in the figure represents higher light intensity.

The samples used were aliquots from a stock 20 microliters Taq cycle sequencing reaction using dye-labeled terminators on a pGEM double-stranded DNA template. The relative spectral position of the fluorescent maximum of each of the four dye-labeled bases (C,T,A, and G) is shown along the left vertical axis for each capillary in FIGS. 11(a)–11(l). The representation in FIG. 11 allows visualization of the results, and the sequence of bases passing the detector is obvious by inspection of the positions of the fluorescent maxima as a function of time (the analyses shown in FIG. 11(g) and 11(j) were failures). However, as used for DNA sequencing, the fluorescent signals are processed by computer and converted directly to the sequence of bases detected by the analysis.

Referring back to FIG. 10(b), the collection fiber optic array 138 has an additional advantage that the optical signals from each capillary 126 have distinct and separate transmission channels to the detector, thereby minimizing cross-talk between adjacent channels. The lower the cross-talk, the greater the sensitivity and accuracy of base calling. To estimate the level of cross-talk between adjacent channels, the emission was recorded for 5 adjacent channels before, during and after $10^{-10}$M fluorescent dye was flowed through the central channel. Only 1–2% of the large fluorescent signal in the central channel was detected in the flanking channels and none in the outside channels.

48-Capillary Embodiment

Larger arrays of capillaries are desirable for large-scale applications. In a system that perfectly confines the illuminating beam, the primary loss of light should be through Fresnel reflections. Minimizing such losses would reduce the deviation from uniform illumination and allow larger arrays of capillaries to be used.

Figure 12A:
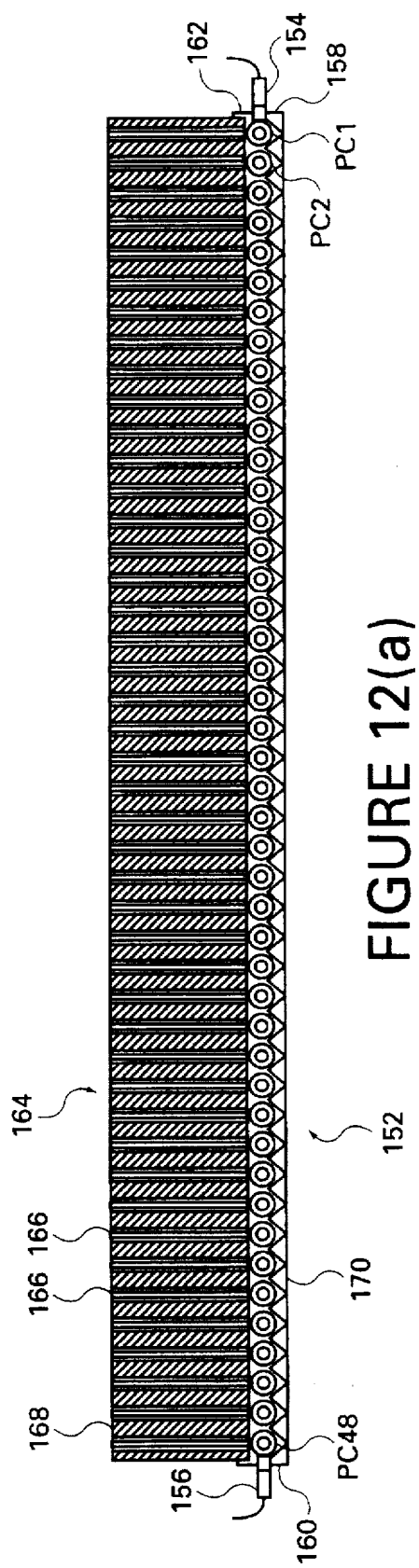
FIG. 12(a) is a transverse cross-section through a 48 capillary optical waveguide and fiber optic collector array of the present invention.
Figure 12B:
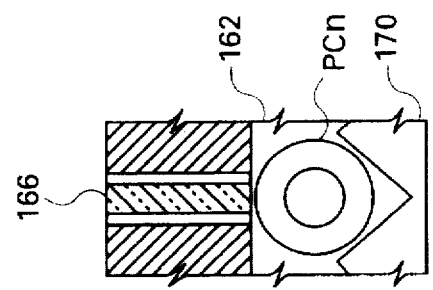
FIG. 12(b) is an enlarged cross-section of a portion of the waveguide of FIG. 12(a) showing one capillary and one collection optical fiber.

FIG. 12(a) shows a schematic of the use of the present invention in a form suitable for DNA sequencing in 48 capillaries (PC1–PC48) simultaneously. The system comprises a 48-capillary module 152 with capillaries PC1–PC48 mounted in a capillary V-block 170. Note that FIG. 12(b) shows an enlarged view of a single capillary PCn. Light from a laser source is launched into a 1×2 fiber optic splitter (not shown) that delivers the laser light to IFOTs 154,156 positioned on opposite sides 158,160 of the 48-capillary module 152. The capillaries are placed in bath 162 of refractive index $n_1$, which could contain water, $n_1$=1.33, or Laser Liquid™, $n_1$=1.30. The solution inside the capillaries contains enough urea or other material commonly used for DNA sequencing that the refractive index $n_3$ is high enough to support confinement for the external medium used. If necessary, divergence of the beam along the length of the capillaries may be compensated by suitable cylindrical lensing (not shown; discussed above). The fluorescent (or another type) photons are collected by an array 164 of 48 detection optical fibers 166 whose light-collecting ends are mounted in a fiber V-groove block 168. The center-to-center spacing of the fiber V-groove block 168 matches that of the capillary V-groove block 170. The other ends of the optical fibers deliver light to a suitable detector, which may employ a CCD. The necessary electric field is applied across each capillary PC1–PC48 in the same manner depicted in FIGS. 10(a) and 10(b), through baths in dish 148 and vessel 150, containing a buffer solution. Using readily available capillaries of the appropriate size, illumination of the 48 capillaries in the array will be uniform enough to provide high-quality data for DNA sequencing, as discussed above.

In view of the foregoing, it will be appreciated that the present invention provides a system for simultaneously illuminating one or more materials in limited volumes of the cores of a plurality of capillaries. With reference to FIG. 8, and bearing in mind the definitions of FIG. 1, the system includes a plurality of substantially cylindrical capillaries 10, 94, each of which includes a substantially cylindrical core 16, 108 and a substantially transparent wall 14 which bounds the core 16, 108 and which includes an inner surface bounding core 16 and an outer surface 24, and a portion 95 to be illuminated. The portions 95 are maintained in a fixed array 96 in which their longitudinal axes 12 are substantially parallel and coplanar. The portions 95 are at least partially immersed in an external medium 18 through which light passes, and the portions 95 contain the one or more materials which are to be illuminated.

With reference to FIGS. 8, 9, 10(a) and 10(b), the system also includes a first light source, such as laser source 110 coupled to IFOT 92, 118, which is capable of illuminating array 96 with a first beam of light (see arrows 20 in FIG. 1) having an optical axis 22 substantially coplanar with and normal to the longitudinal axes 12 of the portions 95 of the capillaries 94. The portions 95 of the capillaries 94, when illuminated with the first beam of light represented by arrows 20 in FIG. 1, form an optical waveguide in which refraction at the outer 24 and inner (bounding region 16) surfaces of the walls 14 of the portions 95 of the capillaries 10, 94 confines a substantial fraction of those light rays which pass through the core of a first capillary in the array 96 to paths that pass through the core of each successive capillary in the array 96. FIG. 3(a) depicts a first capillary C1 and subsequent capillaries C2–C12.

Preferably, the system also includes a second light source (e.g., second IFOT 92) capable of illuminating array 96 with a second beam of light having its optical axis substantially collinear with the optical axis of the first beam of light, such that the first beam and second beam illuminate array 96 from opposite sides. In preferred embodiments, each of the cores 108 has substantially the same radius $r_2$, and the radius $r_i$ of the first beam of light (arrows 20 in FIG. 1) is about the same as or less than the radius $r_2$ of the cores 108. It is preferred that the light source of the system include a laser source, as described above. When a laser source is employed, it is preferred that an IFOT 92 is employed; when it is desired to use the second light source, this may be accomplished by connecting a second IFOT 92 to a laser source such as 110 (FIG. 10(a)) through a suitable splitter.

For many applications, the capillary walls 14 are made of fused silica, and the portions 95 of the capillaries 94 are substantially identical. The external medium 18 can comprise air, a liquid, a vacuum, or any other suitable material. The one or more materials contained in the cores 16, 108 may comprise aqueous solutions. As described above with reference to FIG. 13(b), the system may further preferably include a lens such as cylindrical lens 180 positioned in the path of first beam of light 172, the lens 180 being capable of reducing the divergence of the illuminating beam of light in planes that are parallel to the longitudinal axes of the portions of the capillaries.

In one preferred embodiment of the system, the previously-defined parameters $r_1$, $r_2$, $n_1$, $n_2$ and $n_3$ are selected to satisfy relationship 4. In one specific instance of this embodiment, the value of $r_1/r_2$ may be about 1.64, the value of $n_1$ may be about 1.33, the value of $n_2$ may be about 1.46, and the value of $n_3$ may be greater than about 1.38. Refer to the above discussion of FIG. 7 and the Lu & Yeung *Applied Spectroscopy* article.

In another preferred embodiment of the system, the outer radius $r_1$, inner radius $r_2$, and refractive index $n_2$ of the wall 14 of each capillary 10, 94 in array 96; the spacing X (see FIG. 3(a)) of each capillary 10, 94 in array 96; the index of refraction $n_1$ of external medium 18; the index of refraction $n_3$ of the one or more materials in the core 16, 108 of the capillaries 94; and the radius $r_i$ and divergence of the first beam of light 20 are such that a Snell's law ray-tracing program predicts that refraction at the outer and inner surfaces of the capillary walls 14 will confine substantially all of the light rays which pass through the core 16 of the first capillary in the array 96 to paths that pass through the core of each successive capillary 94 in the array 96.

Referring to FIGS. 8, 9, 10(a) and 10(b), the system preferably also includes a light collector, such as that formed by the collection array 88 coupled to the spectrograph 142, which is positioned to collect light emitted from the cores 108 of the capillaries 94. Most preferably, the light collector includes a separate optical fiber 90 for each capillary 94 in the array 96, and the longitudinal axis of a terminal region of each optical fiber 90, at its light-collecting end 91, is positioned substantially normal to the surface of the capillary 94 from which it collects light, and substantially in a plane that includes the optical axis 22 of the first beam of illuminating light 20. Most preferably, the longitudinal axes of the terminal regions of the optical fibers 90 at the light-collecting ends 91 are positioned substantially orthogonal to the optical axis 22 of the first beam of illuminating light 20. It is also preferable that the terminal regions of the optical fibers 90 are fixed in a flat parallel configuration such that the longitudinal axes of the terminal regions are substantially parallel and coplanar, and such that the spacing of the light-collecting ends 91 substantially matches the spacing of the capillaries 94 in the array 96.

A method for simultaneously illuminating one or more materials in limited volumes of the cores of a plurality of capillaries, in accordance with the present invention, includes the step of providing a plurality of substantially cylindrical capillaries 10, 94, each of which includes a substantially cylindrical core 16, 108, a substantially transparent wall 14 which bounds the core 16, 108 and which includes an inner surface bounding core 16 and an outer surface 24, and a portion 95 to be illuminated. The portions 95 are fixed in an array 96 in which their longitudinal axes 12 are substantially parallel and coplanar. The portions are at least partially immersed in an external medium 18 through which light passes, such that the portions 95 of the capillaries 94, when filled with the one or more materials which are to be illuminated, and when illuminated with a first beam of light 20 having its optical axis 22 substantially coplanar with and normal to the longitudinal axes 12 of the portions 95 of the capillaries 94, form an optical waveguide in which refraction at the outer 24 and inner (bounding core 16) surfaces of the walls 14 of the portions 95 of the capillaries 94 confines a substantial fraction of the light rays 20 which pass through the core 16, 108 of a first capillary in the fixed array 96 to paths that pass through the core 16, 108 of each successive capillary 10, 94 in the array 96.

The method also includes the step of providing the one or more materials which are to be illuminated, and introducing the one or more materials into the cores 16, 108 of the capillaries 10, 94. Further, the method includes the step of causing a first beam of light 20 to travel along an optical axis 22 substantially coplanar with and normal to the longitudinal axes 12 of the portions 95 of the capillaries 10, 94, whereby refraction at the outer and inner surfaces of the walls 14 of the portions 95 of the capillaries 10, 94 confines a substantial fraction of the light rays which pass through the core 16, 108 of a first capillary in array 96 to paths that pass through the core of each successive capillary 94 in array 96.

It is preferable that the method include the additional step of causing a second beam of light (such as from second IFOT 92 in FIG. 9) to travel along an optical axis which is substantially collinear with the optical axis of the first beam of light, such that the first beam and the second beam illuminate the array 96 from opposite sides. It is preferable that each of the cores 16, 108 has substantially the same radius $r_2$, and that the radius $r_i$ of the first beam of light 20 is about the same as or less than the radius $r_2$ of the cores 16, 108 (see FIG. 9).

In the method, it is preferable that the first beam of light is a laser beam. The external medium 18 may include air, a liquid, a vacuum, or any other suitable material. The one or more materials which are provided in the cores 16, 108 of the capillaries 10, 94 may include liquids. The liquids may be aqueous solutions.

As noted above with respect to the system, it is also preferable in the method that each capillary 10, 94 in the array 96 have parameters $r_1, r_2$ and $n_2$ as defined above, with an external medium 18 having an index of refraction n, and the one or more materials in the cores 16, 108 of the capillaries 10, 94 having an index of refraction $n_3$. In this case, the parameters are preferably selected to satisfy relationship 4. Again, as noted above with respect to the system, in another embodiment of the method, the outer radius $r_1$, inner radius $r_2$, and refractive index $n_2$ of the wall 14 of each capillary 10, 94 in the array 96; the spacing X (see FIG. 3(a)) of the capillaries 10, 94 in the array 96; the index of refraction n, of the external medium 18; the indices of refraction $n_3$ of the materials in the cores 16, 108 of the capillaries 94; and the radius $r_i$ and divergence of the first beam of light 20 are such that a Snell's law ray-tracing program predicts that refraction at the outer 24 and inner (bounding core 16) surfaces of the capillary walls 14 will confine substantially all of the light rays which pass through the core 16, 108 of the first capillary in the array 96 to paths that pass through the core 16, 108 of each successive capillary 10, 94 in the array 96.

In some embodiments of the method, it is desirable to collect light emitted from the cores of the portions of the capillaries, such that the method preferably includes the additional step of collecting light emitted from the cores 16, 108 of the capillaries 10, 94. The collecting step preferably includes providing a separate optical fiber 90 for each capillary 94 in array 96, with a light-collecting end 91 of each optical fiber 90 being positioned adjacent to the outer surface 24 of the capillary 10, 94, and with the longitudinal axis of a terminal region of each optical fiber 90 at the light-collecting end 91 thereof being positioned substantially normal to a surface of the capillary 10, 94 from which it collects light, and substantially in a plane that includes the optical axis 22 of the first beam of illuminating light 20.

Most preferably, the method includes the step of positioning the longitudinal axes of the terminal regions of the optical fibers 90 at their light-collecting ends 91 substantially orthogonal to the optical axis 22 of the first beam of illuminating light 20. In this case, it is yet more preferable that the terminal regions of the optical fibers 90 are fixed in a flat parallel configuration such that the longitudinal axes of the terminal regions are substantially parallel and coplanar, and such that the spacing of the light-collecting ends 91 substantially matches the spacing of the capillaries 94 in the array 96.

Referring also to FIG. 13(b), the method preferably also includes the step of reducing the divergence of the first beam of light 172 in planes that are parallel to the longitudinal axes of the portions 95 of the capillaries 94; this reduction of divergence can be accomplished, for example, using the cylindrical lens 180 as discussed above.

It will also be appreciated that the present invention provides an assembly for collecting light emitted from one or more materials. Referring again to FIGS. 8 and 9, and keeping in mind the definitions of FIG. 1, the assembly includes a plurality of substantially cylindrical capillaries 10, 94, each of which includes a substantially cylindrical core 16, 108, a substantially transparent wall 14 which bounds the core 16, 108 and which includes an inner surface bounding core 16 and an outer surface 24, and a portion 95 to be illuminated. The portions 95 are fixed in a first array 96 and have longitudinal axes 12 which are substantially parallel and coplanar. The portions 95 are capable of being at least partially immersed in an external medium 18 through which light passes, such that, when the portions 95 contain materials which are to be illuminated, and such that when a first beam of light (such as beam 20) having its optical axis (such as optical axis 22) substantially coplanar with and normal to the longitudinal axes 12 of the capillaries 10, 94 passes through the portions 95, the portions 95 of the capillaries 10, 94 in the array 96 form an optical waveguide in which refraction at the outer 24 and inner (bounding core 16, 108) surfaces confines a substantial fraction of the light rays which pass through the core 16, 108 of a first capillary in the array 96 to paths that pass through the core of each successive capillary in the array 96.

The assembly also includes a plurality of optical fibers 90, each of which includes a light-collecting end 91 and a terminal region with a longitudinal axis located at the light-collecting end 91. The terminal regions are located in a second fixed array 88 in which the longitudinal axes of the terminal regions are substantially parallel and coplanar, and wherein the spacing of the light-collecting ends 91 substantially matches the spacing of the portions of the capillaries 94 in the array 96 that forms the waveguide. The first fixed array (i.e., array 96 of capillaries 94) and the second fixed array (i.e., array 88 of fibers 90) are configured such that the light-collecting ends 91 of the optical fibers 90 can be positioned to collect light emitted from the cores 16, 108 of the capillaries 94.

Preferably, the second fixed array 88 of optical fibers 90 is positionable so that the light-collecting ends 91 of the optical fibers 90 are adjacent to the outer surfaces 24 of the capillaries 10, 94 from which they collect light. Most preferably, the second fixed array 88 of optical fibers 90 is positionable such that the longitudinal axes of the terminal regions of the optical fibers 90 are substantially normal to the surfaces 24 of the capillaries 94 (in portions 95) from which they collect light.

The assembly for collecting light according to the present invention preferably also includes first and second supports for holding the capillaries 94 and the optical fibers 90 in place in the respective first and second fixed arrays 96, 88. It is preferable that each of the first and second supports include a plurality of substantially straight, parallel cavities with substantially coplanar longitudinal axes, such that the cavities of the first and second supports receive and align the portions of the capillaries 95 and the terminal regions of the optical fibers 90 respectively. Any suitable configuration for the first and second supports can be employed. However, it is possible that the first support, i.e., that for the array 96 of capillaries 94, be formed from the blocks 104, 107 as described above. Further, it is possible that the second support, i.e., that for the optical fibers 90 of collection array 88, be formed from block 106 as described above. While the above-referenced cavities can be any suitable shape, it will be appreciated that they are preferably grooves on flat surfaces of the first and second supports, most preferably, V-grooves 98 on flat surfaces of the main block 100 which is used to form blocks 104, 106, 107. It is also preferable that the grooves should be substantially uniformly spaced. As discussed above, for volume production, the first and second supports could be formed from high-precision molds, or by any other suitable technique, and are not limited to the specific cut block embodiment shown in FIG. 8. It is also preferable that the assembly for collecting light according to the present invention include a positioning member, such as second X-Y-Z translation stage 136 discussed above, for moving the second fixed array 88 of optical fibers 90 with respect to the first fixed array 96 of capillaries 94.

The assembly for collecting light in accordance with the present invention may also include a light source capable of providing a first beam of light having its optical axis 22 substantially co-planar with and normal to the longitudinal axes 12 of the portions 95 of the capillaries 10, 94. It is preferable that the light source include a laser source, such as laser source 110 in FIG. 10(a), and when a laser source 110 is employed, it is preferable that an IFOT 92 (FIG. 9) also be employed. As discussed above, the assembly preferably also includes a light source capable of providing a second beam of light which has its optical axis substantially collinear with the optical axis 22 of the first beam of light 20, such that the first and second beams illuminate the array 96 of capillaries 94 from opposite sides. The light source capable of providing the second beam of light may advantageously be a second IFOT 92, as shown in FIG. 9; as discussed above, each IFOT can be connected to the same laser source through a suitable splitter.

As discussed above, the assembly according to the present invention preferably includes means, such as second X-Y-Z translation stage 136, for positioning the second fixed array 88 of optical fibers 90 so that light-collecting ends 91 of the fibers 90 are adjacent to the outer surfaces 24 of the capillaries 10, 94 from which they collect light. Preferably, the means for positioning is capable of positioning the longitudinal axes of the terminal regions of the fibers 90 substantially normal to the surfaces 24 of the capillaries 10, 94 from which the optical fibers 90 collect light and substantially in a plane that includes the optical axis 22 of the first beam 20 of illuminating light. Most preferably, the longitudinal axes of the terminal regions of the optical fibers 90 at the light-collecting ends 91 are positioned substantially orthogonal to the optical axis 22 of the first beam 20 of illuminating light.

While there have been described what are presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A system for simultaneously illuminating one or more materials in limited volumes of the cores of a plurality of capillaries, said system comprising:

a plurality of substantially cylindrical capillaries, each of said capillaries including a substantially cylindrical core, a substantially transparent wall bounding said core and including inner and outer surfaces, and a portion to be illuminated, said portions being in a fixed array in which their longitudinal axes are substantially parallel and coplanar, said portions being at least partially immersed in an external medium through which light passes, said portions containing said one or more materials to be illuminated; and a first light source capable of illuminating said array with a first beam of light having an optical axis substantially coplanar with and normal to said longitudinal axes of said portions of said capillaries;

said portions of said capillaries, when illuminated with said first beam of light forming an optical waveguide in which refraction at the outer and inner surfaces of said walls of said portions of said capillaries confines a substantial fraction of the light rays which pass through the core of a first capillary in said array to paths that pass through the core of each successive capillary in said array.

2. The system of claim 1, further comprising a second light source capable of illuminating said array with a second beam of light having its optical axis substantially collinear with said optical axis of said first beam of light, such that said first beam and said second beam illuminate said array from opposite sides.

3. The system of claim 1 wherein each of said cores has substantially the same radius, and the radius of said first beam of light is about the same as or less than the radius of said cores.

4. The system of claim 1 wherein said light source includes a laser source.

5. The system of claim 4 wherein said light source also includes an integrated fiber optic transmitter.

6. The system of claim 1 wherein said capillary walls are made of fused silica.

7. The system of claim 1 wherein said portions of said capillaries are substantially identical.

8. The system of claim 1 wherein said external medium comprises air.

9. The system of claim 1 wherein said external medium comprises a liquid.

10. The system of claim 1 wherein said one or more materials in said cores of said capillaries comprise aqueous solutions.

11. The system of claim 1 further including a lens positioned in the path of said first beam of light, said lens capable of reducing the divergence of said beam of light in planes that are parallel to said longitudinal axes of said portions of said capillaries.

12. The system of claim 1 wherein:

the wall of each capillary in said array has an outer radius $r_1$, an inner radius $r_2$, and an index of refraction $n_2$;

said external medium has an index of refraction $n_1$;

said one or more materials in said cores of said capillaries have an index of refraction $n_3$; and $$\frac{n_2 - n_1}{r_1} \geq \frac{n_2 - n_3}{r_2}.$$

13. The system of claim 12 wherein $r_1/r_2$ is about 1.64, $n_1$ is about 1.33, $n_2$ is about 1.46, and $n_3$ is greater than about 1.38.

14. The system of claim 1 wherein the outer radius, inner radius, and refractive index of the wall of each capillary in said array, the spacing of said portions of said capillaries in said fixed array, the index of refraction of said external medium, the indices of refraction of said one or more materials in said cores of said capillaries, and the radius and divergence of said first beam of light are such that a Snell's law ray-tracing program predicts that refraction at the outer and inner surfaces of said capillary walls will confine substantially all of the light rays which pass through the core of said first capillary in said array to paths that pass through the core of each successive capillary in said array.

15. The system of claim 1, further comprising a light collector positioned to collect light emitted from said cores of said capillaries.

16. The system of claim 15 wherein said light collector comprises a separate optical fiber for each capillary in said array, a light-collecting end of each optical fiber being positioned adjacent to the outer surface of the capillary from which it collects light, and the longitudinal axis of a terminal region of each optical fiber at its light-collecting end being positioned substantially normal to the surface of the capillary from which it collects light and substantially in a plane that includes the optical axis of said first beam of illuminating light.

17. The system of claim 16 wherein said longitudinal axes of said terminal regions of said optical fibers at said light-collecting ends are positioned substantially orthogonal to said optical axis of said first beam of illuminating light.

18. The system of claim 16 wherein said terminal regions of said optical fibers are fixed in a flat parallel configuration such that said longitudinal axes of said terminal regions are substantially parallel and coplanar, and the spacing of said light-collecting ends substantially matches the spacing of said capillaries in said array.

19. A method for simultaneously illuminating one or more materials in limited volumes of the cores of a plurality of capillaries, comprising:
providing a plurality of substantially cylindrical capillaries, each of said capillaries including a substantially cylindrical core, a substantially transparent wall bounding said core and including inner and outer surfaces, and a portion to be illuminated, said portions being in a fixed array in which their longitudinal axes are substantially parallel and coplanar, said portions being at least partially immersed in an external medium through which light passes such that said portions of said capillaries, when filled with materials to be illuminated and illuminated with a first beam of light having its optical axis substantially coplanar with and normal to said longitudinal axes of said portions of said capillaries, form an optical waveguide in which refraction at the outer and inner surfaces of said walls of said portions of said capillaries confines a substantial fraction of the light rays which pass through the core of a first capillary in said fixed array to paths that pass through the core of each successive capillary in said array;
providing said one or more materials to be illuminated and introducing said materials into said cores of said capillaries; and
causing a first beam of light to travel along an optical axis substantially coplanar with and normal to said longitudinal axes of said portions of said capillaries, whereby refraction at the outer and inner surfaces of said walls of said portions of said capillaries confines a substantial fraction of the light rays which pass through the core of a first capillary in said array to paths that pass through the core of each successive capillary in said array.

20. The method of claim 19 further comprising the step of causing a second beam of light to travel along an optical axis substantially collinear with said optical axis of said first beam of light, such that said first beam and said second beam illuminate said array from opposite sides.

21. The method of claim 19 wherein each of said cores has substantially the same radius, and the radius of said first beam of light is about the same as or less than the radius of said cores.

22. The method of claim 19 wherein said first beam is a laser beam.

23. The method of claim 19 wherein said external medium comprises air.

24. The method of claim 19 wherein said external medium comprises a liquid.

25. The method of claim 19 wherein said one or more materials provided in said cores of said capillaries comprise liquids.

26. The method of claim 19 wherein said one or more materials provided in said cores of said capillaries comprise aqueous solutions.

27. The method of claim 19 wherein:
the wall of each capillary in said array has an outer radius $r_1$, an inner radius $r_2$, and an index of refraction $n_2$;
said external medium has an index of refraction $n_1$;
said one or more materials in said cores of said capillaries have an index of refraction $n_3$; and $$\frac{n_2 - n_1}{r_1} \geq \frac{n_2 - n_3}{r_2}.$$

28. The method of claim 19 wherein the outer radius, inner radius, and refractive index of the wall of each capillary in said array, the spacing of said portions of said capillaries in said fixed array, the index of refraction of said external medium, the indices of refraction of said materials in said cores of said capillaries, and the radius and divergence of said first beam of light are such that a Snell's law ray-tracing program predicts that refraction at the outer and inner surfaces of said capillary walls will confine substantially all of the light rays which pass through the core of said first capillary in said array to paths that pass through the core of each successive capillary in said array.

29. The method of claim 19 including the step of collecting light emitted from said cores of said portions of said capillaries.

30. The method of claim 29 wherein said step of collecting light includes providing a separate optical fiber for each capillary in said array, a light-collecting end of each optical fiber being positioned adjacent to the outer surface of the capillary from which it collects light, and the longitudinal axis of a terminal region of each optical fiber at a light-collecting end thereof being positioned substantially normal to a surface of the capillary from which it collects light and substantially in a plane that includes the optical axis of said first beam of illuminating light.

31. The method of claim 30 including positioning said longitudinal axes of said terminal regions of said optical fibers at said light-collecting ends substantially orthogonal to said optical axis of said beam of illuminating light.

32. The method of claim 31 wherein said terminal regions of said optical fibers are fixed in a flat parallel configuration such that said longitudinal axes of said terminal regions are substantially parallel and coplanar, and the spacing of said light-collecting ends substantially matches the spacing of said capillaries in said array.

33. The method of claim 19 including the step of reducing the divergence of said first beam of light in planes that are parallel to said longitudinal axes of said portions of said capillaries.

34. An assembly for collecting light emitted from one or more materials comprising:
a plurality of substantially cylindrical capillaries, each of said capillaries including a substantially cylindrical core, a substantially transparent wall bounding said core and including inner and outer surfaces, and a portion to be illuminated, said portions being in a first fixed array in which their longitudinal axes are substantially parallel and coplanar such that, when said portions are at least partially immersed in an external medium through which light passes, and said portions contain one or more materials to be illuminated, and a first beam of light having its optical axis substantially coplanar with and normal to said longitudinal axes passes through said portions, said portions of said capillaries in said array form an optical waveguide in which refraction at the outer and inner surfaces of said walls of said portions of said capillaries confines a substantial fraction of the light rays which pass through the core of a first capillary in said array to paths that pass through the core of each successive capillary in said array; and a plurality of optical fibers, each of said optical fibers including a light-collecting end and a terminal region with a longitudinal axis at said light-collecting end, said terminal regions being in a second fixed array in which said longitudinal axes of said terminal regions are substantially parallel and coplanar, and wherein the spacing of said light-collecting ends substantially matches the spacing of said portions of said capillaries in said first fixed array that forms said waveguide, said first and second fixed arrays being configured such that said light-collecting ends of said optical fibers can be positioned to collect light emitted from said cores of said capillaries.

35. The assembly of claim 34 wherein said second fixed array of optical fibers is positionable so that said light collecting ends of said optical fibers are adjacent to the outer surfaces of said capillaries from which they collect light.

36. The assembly of claim 34 wherein said second fixed array of optical fibers is positionable so that said longitudinal axes of said terminal regions are substantially normal to the surfaces of the capillaries from which said optical fibers collect light.

37. The assembly of claim 34 including first and second supports for holding said capillaries and said optical fibers in place in said respective first and second fixed arrays, each of said first and second supports including a plurality of substantially straight, parallel cavities with substantially coplanar longitudinal axes, said cavities of said first and second supports receiving and aligning said portions of said capillaries and said terminal regions of said optical fibers, respectively.

38. The assembly of claim 37 wherein said cavities are grooves on flat surfaces of said first and second supports.

39. The assembly of claim 38 wherein said grooves are V-grooves.

40. The assembly of claim 38 wherein said grooves are substantially uniformly spaced.

41. The assembly of claim 34 further comprising positioning members for moving said second fixed array of optical fibers with respect to said first fixed array of capillaries.

42. The assembly of claim 34, further comprising:

a first light source capable of providing a first beam of light having its optical axis substantially coplanar with and normal to said longitudinal axes of said portions of said capillaries.

43. The assembly of claim 42, further comprising a second light source capable of providing a second beam of light having its optical axis substantially collinear with said optical axis of said first beam of light, such that said first beam and said second beam illuminate said array of capillaries from opposite sides.

44. The assembly of claim 42 wherein said light source includes a laser source.

45. The assembly of claim 44 wherein said light source also includes an integrated fiber optic transmitter.

46. The assembly of claim 44 including means for positioning said second fixed array of optical fibers so that light-collecting ends of said optical fibers are adjacent to the outer surfaces of said capillaries from which they collect light.

47. The assembly of claim 46 wherein said means for positioning said array of optical fibers is capable of positioning said longitudinal axes of said terminal regions substantially normal to the surfaces of the capillaries from which said optical fibers collect light and substantially in a plane that includes the optical axis of said first beam of illuminating light.

48. The assembly of claim 47 wherein said longitudinal axes of said terminal regions of said optical fibers at said light-collecting ends are positioned substantially orthogonal to said optical axis of said first beam of illuminating light.

49. The assembly of claim 34 wherein:

the wall of each capillary in said first fixed array has an outer radius $r_1$, an inner radius $r_2$, and an index of refraction $n_2$;

said external medium has an index of refraction $n_1$;

said one or more materials in said cores of said capillaries have an index of refraction $n_3$; and $$\frac{n_2 - n_1}{r_1} \geq \frac{n_2 - n_3}{r_2}.$$

50. The assembly of claim 34 wherein the outer radius, inner radius, and refractive index of the wall of each capillary in said first fixed array, the spacing of said portions of said capillaries in said first fixed array, the index of refraction of said external medium, the indices of refraction of said one or more materials in said cores of said capillaries, and the radius and divergence of said first beam of light are such that a Snell's law ray-tracing program predicts that refraction at the outer and inner surfaces of said capillary walls will confine substantially all of the light rays which pass through the core of said first capillary in said array to paths that pass through the core of each successive capillary in said array.

* * * * *